United States Patent [19]

Nomura et al.

[11] Patent Number: 5,740,323
[45] Date of Patent: Apr. 14, 1998

[54] EVOLUTIONARY ADAPTATION TYPE INFERENCE KNOWLEDGE EXTRACTING APPARATUS CAPABLE OF BEING ADAPTED TO A CHANGE OF INPUT/OUTPUT DATE AND POINT OF SALES DATA ANALYZING APPARATUS USING THE APPARATUS

[75] Inventors: Tatsuya Nomura, Nara; Tsutomu Miyoshi, Sakura, both of Japan

[73] Assignee: Sharp Kabushiki Kaisha, Osaka, Japan

[21] Appl. No.: 627,111

[22] Filed: Apr. 3, 1996

[30] Foreign Application Priority Data

Apr. 5, 1995 [JP] Japan ................... 7-080220

[51] Int. Cl.$^6$ ................................ G06F 15/18
[52] U.S. Cl. ................... 395/13; 395/3; 395/900
[58] Field of Search .................. 395/3, 10–13, 395/61, 51, 50, 53, 900; 364/550

[56] References Cited

U.S. PATENT DOCUMENTS

| 5,412,756 | 5/1995 | Bauman et al. | 395/50 |
| 5,661,668 | 8/1997 | Yemini et al. | 364/550 |
| 5,664,064 | 9/1997 | Nakao et al. | 395/13 |

FOREIGN PATENT DOCUMENTS

| 6-169199 | 6/1994 | Japan . |
| 6-187473 | 7/1994 | Japan . |

OTHER PUBLICATIONS

Park et al. "Genetic–based new fuzzy reasoning models with application to fuzzy control." IEEE Transactions on systems, man, and cybernetics, vol. 24, No. 1, pp. 39–47, Jan. 1994.
Bothe, "Fuzzy Head: a mechanic human head robot controlled by a fuzzy inference engine." 1995 IEEE/IAS International conference on industrial automation and control, pp. 71–76, Jan. 1995.

Quinlan, "Induction of Decision Trees", Machine Learning 1, 1986.
Umano et al, "Generation of Fuzzy Rules from Numerical Data by ID3 Algorithm and their Inference Method", 9th Fuzzy System Symposium (Sapporo, May 19–21, 1993).
Sakurai et al, "Generating a Fuzzy Decision Tree by Inductive Learning", Institute of Electrical Engineers, Transaction, vol. 113–C, No. 7, 1993.
Nomura et al, "A Learning Method of Fuzzy Reasoning by Delta Rule—A Structure Identification of Antecedent Part by Genetic Algorithm–", Transactions of FAN Symposium 1991.
Ishibuchi et al, "Gentic Operations for Rule Selection in Fuzzy Classification Systems", Transactions or 9th Fuzzy System Symposium (Sapporo, May 19–21, 1993).

Primary Examiner—Tariq R. Hafiz
Attorney, Agent, or Firm—Nixon & Vanderhye P.C.

[57] ABSTRACT

There is provided an inference knowledge extracting apparatus capable of being adapted to a change of input/output data. In a fuzzy rule individual group storing section is stored a group of individuals having a gene string associated with a fuzzy rule of a fuzzy rule storing section by a fuzzy rule gene associating section. A fuzzy rule individual selecting section stochastically selects individuals having a small output error with respect to the input/output data based on a calculation result of fitness obtained by an individual fitness calculating section. A fuzzy rule individual gene manipulating section executes a gene manipulating operation on each individual selected by the individual fitness calculating section. The fuzzy rule gene associating section, individual fitness calculating section, fuzzy rule individual selecting section, fuzzy rule individual gene manipulating section and a rule weight deciding section are functioned, thereby executing an evolutionary adaptation operation to extract a fuzzy rule that is evolutionarily adapted to the change of the input/output data.

9 Claims, 17 Drawing Sheets

Fuzzy rule (k,l)

if $I_1$ is $F_{kl1}$ and $I_2$ is $F_{kl2}$ and ··· and $I_j$ is $F_{klj}$ ··· and $I_n$ is $F_{kln}$, then c is $C_k$ with weight $\omega_{kl}$ Individual $Ind_{kl}$ $(\mu_{kl1} \quad \sigma_{kl1} \quad \mu_{kl2} \quad \sigma_{kl2} \cdots \cdots \mu_{klj} \quad \sigma_{klj} \cdots \cdots \mu_{kln} \quad \sigma_{kln})$ String having length of 2n real number values

Fig.5

(Crossing-over operation 1)

Two parent individuals belonging to identical group $POP_k$ $Ind_{kl}1: (\mu_{kl}1_1 \; \sigma_{kl}1_1 \; \ldots \; \mu_{kl}1_n \; \sigma_{kl}1_n)$
$Ind_{kl}2: (\mu_{kl}2_1 \; \sigma_{kl}2_1 \; \ldots \; \mu_{kl}2_n \; \sigma_{kl}2_n)$ $\rightarrow$ One offspring individual $((\mu_{kl}1_1 + \mu_{kl}2_1)/2 \; (\sigma_{kl}1_1 + \sigma_{kl}2_1)/2 \cdots (\mu_{kl}1_n + \mu_{kl}2_n)/2 \; (\sigma_{kl}1_n + \sigma_{kl}2_n)/2)$ (Crossing-over operation 2)

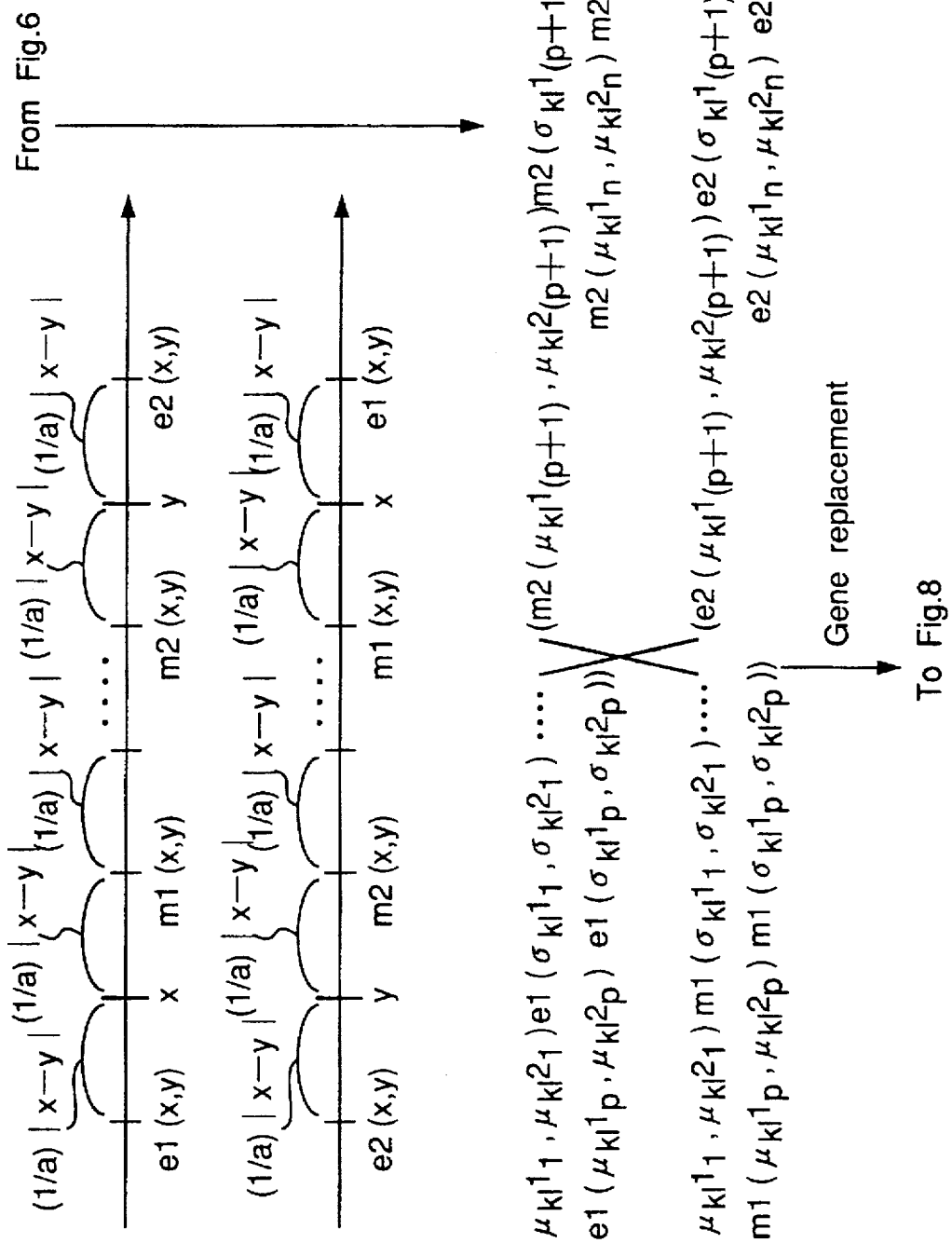

Fig.8

From Fig.7 →

Two offspring individuals $(e1(\mu_{kl}1_1, \mu_{kl}2_1) e1(\sigma_{kl}1_1, \sigma_{kl}2_1) \cdots e1(\mu_{kl}1_p, \mu_{kl}2_p) e1(\sigma_{kl}1_p, \sigma_{kl}2_p)$
$e2(\mu_{kl}1_{(p+1)}, \mu_{kl}2_{(p+1)}) e2(\sigma_{kl}1_{(p+1)}, \sigma_{kl}2_{(p+1)}) \cdots e2(\mu_{kl}1_n, \mu_{kl}2_n) e2(\sigma_{kl}1_n, \sigma_{kl}2_n))$ $(m1(\mu_{kl}1_1, \mu_{kl}2_1) m1(\sigma_{kl}1_1, \sigma_{kl}2_1) \cdots m1(\mu_{kl}1_p, \mu_{kl}2_p) m1(\sigma_{kl}1_p, \sigma_{kl}2_p)$
$m2(\mu_{kl}1_{(p+1)}, \mu_{kl}2_{(p+1)}) m2(\sigma_{kl}1_{(p+1)}, \sigma_{kl}2_{(p+1)}) \cdots m2(\mu_{kl}1_n, \mu_{kl}2_n) m2(\sigma_{kl}1_n, \sigma_{kl}2_n))$ (Mutational operation 1)

Fig.11

(Mutational operation 2)

Individual (before mutation)

$Ind_{kl}$ ( $\mu_{kl1}$ $\sigma_{kl1}$ ..... $\mu_{klp}$ $\sigma_{klp}$ .... $\mu_{kl(p+h)}$ $\sigma_{kl(p+h)}$ ..... $\mu_{kln}$ $\sigma_{kln}$ )

Arbitrarily selected mutating point

Mutation use gene string (partial gene string of another individual)

VIRUS ( $\mu_{kl'p'}$ $\sigma_{kl'p'}$ ..... $\mu_{kl'(p'+h)}$ $\sigma_{kl'(p'+h)}$ )

$\longrightarrow$

Individual (after mutation)

$Ind_{kl}$
( $\mu_{kl1}$ $\sigma_{kl1}$ ..... $\mu_{kl(p-1)}$ $\sigma_{kl(p-1)}$ $\mu_{kl'p'}$ $\sigma_{kl'p'}$ ..... $\mu_{kl'(p'+h)}$ $\sigma_{kl'(p'+h)}$ ..... $\mu_{kln}$ $\sigma_{kln}$ )

Mutation use gene string (after mutation)

VIRUS ( $\mu_{klp}$ $\sigma_{klp}$ ..... $\mu_{kl(p+h)}$ $\sigma_{kl(p+h)}$ )

EVOLUTIONARY ADAPTATION TYPE INFERENCE KNOWLEDGE EXTRACTING APPARATUS CAPABLE OF BEING ADAPTED TO A CHANGE OF INPUT/OUTPUT DATE AND POINT OF SALES DATA ANALYZING APPARATUS USING THE APPARATUS

BACKGROUND OF THE INVENTION

1. Field of the Invention

The present invention relates to an inference knowledge extracting apparatus which extracts an inference knowledge when using a fuzzy inference apparatus for executing inference based on a fuzzy knowledge by managing input/output data constituted by a combination of an input value comprised of a plurality of numeric attributes and an output value comprised of one discrete value or non-numeric value. The present invention relates, in particular, to an evolutionary adaptation type inference knowledge extracting apparatus using a hereditary method capable of automatically adaptively extracting on line a tendency of given input/output data as a rule or knowledge even when the tendency dynamically changes, and to a point of sales (POS) data analyzing apparatus employing the apparatus.

2. Description of the Prior Art

As a system for automatically extracting a common regularity owned by a set of input/output data constituted by a combination of an input value comprised of a plurality of numeric attributes and an output value comprised of one discrete value or non-numeric value such as a symbol, there exists in the mainstream a decision tree system for extracting a rule owned by the input/output data by successively classifying the input/output data by the attribute of the input value and expressing a process of dividing the set of the input/output data in classifying the input/output data by a tree structure.

According to the decision tree system, a specified attribute (input attribute) is selected from a plurality of input values by certain evaluation criteria, and the set of the input/output data is divided by each input value having the selected input attribute. Then, by subjecting each divided pieces of the input/output data set to the same operation as above, there is formed a tree structure for dividing the finally obtained input/output data set into subsets having same output values.

Among such decision tree systems as described above, an ID3 proposed in a reference document 1 (J. R. Quinlan: "Induction of Decision Trees", Machine Learning 1, 1986) is a representative system. According to the ID3, the amount of information of the input/output data set to be divided and the input attributes are calculated, and based on the calculation result, an input attribute capable of performing the most efficient division is selected.

However, the decision tree system represented by the above ID3 is effective only when the attribute of the input value assumes a discrete value or a non-numeric value. Therefore, when the input value has a numeric attribute, the numeric attribute of the input value must be converted into a discrete value.

In view of the above, as a system for automatically extracting a common regularity owned by the input/output data set by improving the above problems, a fuzzy ID3 for fuzzily dividing the input/output data set by classifying the input attributes of an input value by means of a fuzzy membership function is proposed in a reference document 2 (UMANO et al., "Extraction and Inference Method of Fuzzy Rule Based on ID3", 8th Fuzzy System Symposium Preparatory Documents, 1993) and a reference document 3 (SAKURAI et al., "Formation of Fuzzy Decision Tree by Inductive Learning", institute of Electrical Engineers, Transaction C, vol. 113, 7th issue, 1993).

However, according to the regularity extracting system of the input/output data set as proposed in the above conventional reference documents 1 through 3, the tree structure cannot be adaptively changed when the tendency owned by the input/output data dynamically changes. Therefore, it is required to totally reassemble the tree structure representing the dividing process of the input/output data for a new input/output data set.

On the other hand, as a method for perceiving a dynamic change of the tendency owned by the input/output data, there have been proposed in recent years a great number of methods using a neural network. However, it is difficult to clearly express a neural network constructed through learning in the form of a knowledge or a rule, and it is hard to understand the regularity of the input/output data set that the constructed neural network desires to express.

Furthermore, a method for automatically extracting a fuzzy rule by means of a hereditary algorithm simulating the evolution of a living thing is proposed in a reference document 4 (NOMURA et al., "Learning Type Fuzzy Inference By Delta Rule—Identification of Anterior Part By Hereditary Algorithm", Transactions Of FAN Symposium, 1991) and a reference document 5 (ISHIBUCHI et al., "Hereditary Operations For Rule Selection In Fuzzy Recognition System", Transactions Of 9th Fuzzy System Symposium, 1993).

The automatic fuzzy rule extracting method proposed in the above reference documents 4 and 5 are intended to select the most appropriate one for input/output data among a preparatorily given limited number of fuzzy membership functions or a limited number of fuzzy rules. For the above purposes, each employed gene assumes either of binary numbers 0 and 1 so as to indicate which membership function or fuzzy rule is to be selected.

That is, the above conventional automatic fuzzy rule extracting method does not have such a construction that the shape of the fuzzy membership function itself dynamically changes according to the change of tendency of the input/output data.

SUMMARY OF THE INVENTION

The object of the present invention is therefore to provide an evolutionary adaptation type inference knowledge extracting apparatus which constitutes a gene individual group for expressing a fuzzy rule through learning by means of input/output data, and is evolutionarily adapted to the change of tendency of the input/output data by using the gene individual group. Another object of the present invention is to provide a POS analyzing apparatus employing the evolutionary adaptation type inference knowledge extracting apparatus.

In order to achieve the aforementioned object, there is provided an evolutionary adaptation type inference knowledge extracting apparatus comprising:

- an input/output data storing section which stores input/output data constituted by a combination of input data comprised of a plurality of numeric values and output data comprised of one discrete value or non-numeric value;
- a fuzzy rule gene associating section which associates each of a plurality of fuzzy rules stored in a fuzzy rule storing section with an individual comprised of a gene string for expressing a parameter of each fuzzy membership function of the fuzzy rule by a real number value;

a fuzzy rule individual group storing section which stores a group of a plurality of individuals associated with the fuzzy rule having an identical discrete value or non-numeric value in a posterior part thereof by the fuzzy rule gene associating section;

an individual fitness calculating section which operates, based on a fitness of an anterior part of the fuzzy rule associated with an individual by the fuzzy rule gene associating section with respect to all input/output data stored in the input/output data storing section, to calculates a fitness of the individual;

a fuzzy rule individual selecting section which stochastically selects an individual having a high fitness to the set of the input/output data stored in the input/output data storing section based on the fitness of each individual calculated by the individual fitness calculating section;

a fuzzy rule individual gene manipulating section which generates a new individual by subjecting the individual stored in the fuzzy rule individual group storing section to a gene manipulating operation; and a rule weight deciding section which operates, based on the fitness calculated by the individual fitness calculating section, to normalize the fitness of each individual every group, thereby deciding a weight of the fuzzy rule corresponding to the individual; whereby each individual fitted to a characteristic of the input/output data stored in the input/output data storing section is selected, and a fuzzy rule is extracted that is evolutionarily adapted to the input/output data by subjecting the group of the selected individuals to an evolutionary adaptation operation.

According to the present invention, the input/output data constituted by a combination of input data comprised of a plurality of numeric values and output data comprised of one discrete value or a non-numeric value is stored in the input/output data storing section.

Then, after the input/output data stored in the input/output data storing section are successively read by the fuzzy rule extracting section, the individual fitness calculating section functions.

Then, the fitness of each individual stored in the fuzzy rule individual group storing section with respect to the input/output data is calculated by the individual fitness calculating section based on the degree of fitness of the anterior part of the fuzzy rule that has been associated by the fuzzy rule gene associating section and stored in the fuzzy rule storing section with respect to all the input/output data. Then, the fuzzy rule individual selecting section stochastically selects the individual fitted to the characteristic of the set of the input/output data based on the calculated fitness of each individual.

Thereafter, the fuzzy rule individual gene manipulating section effects the gene manipulating operation on the selected individual so as to generate a new individual.

Subsequently, the rule weight deciding section normalizes the fitness of each newly generated individual every group based on the fitness calculated by the individual fitness calculating section, so that the weight of the fuzzy rule corresponding to the individual is decided.

Thus, the fuzzy rule that has been evolutionarily adapted to the input/output data is extracted.

Therefore, when the tendency of the input/output data stored in the input/output data storing section dynamically changes, the fuzzy rule gene associating section, individual fitness calculating section, fuzzy rule individual selecting section, fuzzy rule gene manipulating section and rule weight deciding section execute the evolutionary adaptation operation, so that a fuzzy rule is extracted easily in an evolutionary adaptation manner.

Furthermore, according to one embodiment, the fuzzy rule individual gene manipulating section has a crossing-over gene manipulating means, using as genes real number values based on two corresponding genes of two individuals belonging to an identical group stored in the fuzzy rule individual group storing section, for executing a crossing-over gene manipulating operation for generating a new individual belonging to the group, and replacing all the individuals in the group with the newly generated individual.

The crossing-over gene manipulating operation is executed by the crossing-over gene manipulating means of the fuzzy rule individual gene manipulating section, so that, by using as genes real number values based on the two corresponding genes of the two individuals belonging to an identical group stored in the fuzzy rule individual group storing section, a new individual belonging to the group is generated, and all the individuals in the group are replaced by the newly generated individual.

Thus, the individuals having a high fitness selected by the fuzzy rule individual selecting section is evolved so as to be further adapted to the input/output data through the crossing-over gene manipulating operation.

Furthermore, according to one embodiment, the crossing-over gene manipulating means has a gene generating means for obtaining an average value of corresponding two genes of the two individuals so as to generate a gene of the new individual.

An average value of the corresponding two genes of the two individuals is obtained by the gene generating means of the crossing-over gene manipulating means, so that a gene of the new individual is generated.

Furthermore, according to one embodiment, the crossing-over gene manipulating means has a gene generating means for putting a real number value which is either one of the corresponding two genes of the two individuals close to or apart from an average value of both the genes so as to generate a gene of the new individual.

A real number value that is either one of the corresponding two genes of the two individuals is put close to or apart from the average value of both the genes by the gene generating means of the crossing-over gene manipulating means.

Furthermore, according to one embodiment, the fuzzy rule individual gene manipulating section has a mutational gene manipulating means for executing a mutational gene manipulating operation for replacing an arbitrary gene of each individual stored in the fuzzy rule individual group storing section with another real number value.

A mutational gene manipulating operation is executed by the mutational gene manipulating means of the fuzzy rule individual gene manipulating section, so that an arbitrary gene of each individual stored in the fuzzy rule individual group storing section is replaced by another real number value.

Thus, each individual having a high fitness selected by the fuzzy rule individual selecting section is evolved so as to be further adapted to the input/output data through the mutational gene manipulating operation.

Furthermore, according to one embodiment, the mutational gene manipulating means has a gene replacing means for replacing the arbitrary gene with an arbitrary real number value when executing the gene replacing operation.

An arbitrary gene of each individual stored in the fuzzy rule individual group storing section is replaced by an arbitrary real number value by the gene replacing means of the mutational gene manipulating means. Thus, the gene replacement of the individual is executed.

Furthermore, according to one embodiment, the mutational gene manipulating means has a partial gene string replacing means for replacing a partial gene string subsequent to the arbitrary gene with a partial gene string of another arbitrary individual when executing the gene replacing operation.

A partial gene string subsequent to the arbitrary gene of each individual stored in the fuzzy rule individual group storing section is replaced by an arbitrary partial gene string of another individual by the partial gene string replacing means of the mutational gene manipulating means.

Thus, the gene replacement of the individual is executed.

Furthermore, according to one embodiment, there is provided a fuzzy inference apparatus comprising:

the evolutionary adaptation type inference knowledge extracting apparatus;

an inference input section for inputting numeric data for inference;

a fuzzy inference section for effecting fuzzy inference on the numeric data inputted from the inference input section by means of a fuzzy rule extracted by the evolutionary adaptation type inference knowledge extracting apparatus;

an output section for outputting the fuzzy rule extracted by the evolutionary adaptation type inference knowledge extracting apparatus or a result of the fuzzy inference executed by the fuzzy inference section; and an inference result correcting section which operates, when correcting the inference result of the numeric data inputted to the fuzzy inference section, to form an input/output data comprised of a combination of the numeric data and corrected data of the inference result, and input the generated data in a feedback manner to an input/output data storing section of the evolutionary adaptation type inference knowledge extracting apparatus.

Numeric data for inference is inputted from the inference input section. Then, the fuzzy inference operation is effected on the inputted numeric data by means of the fuzzy rule extracted by the evolutionary adaptation type inference knowledge extracting apparatus. Then, the extracted fuzzy rule or the fuzzy inference result is outputted by the output section.

On the other hand, in correcting the thus obtained fuzzy inference result, an input/output data constituted by a combination of the numeric data and the corrected data of the inference result is formed by the inference result correcting section, and then inputted in a feedback manner to the input/output data storing section of the evolutionary adaptation type inference knowledge extracting apparatus. Then, the additional evolutionary adaptation operation is effected on the fuzzy rule individual group storing section mounted in the evolutionary adaptation type inference knowledge extracting apparatus by the additional input/output data, so that a fuzzy inference result can be obtained easily in an evolutionary adaptation manner by the fuzzy inference section.

Furthermore, according to one embodiment, there is provided a point of sales data analyzing apparatus comprising:

a data format transforming section for transforming a point of sales data into a format of input/output data constituted by a combination of input data comprised of a plurality of numeric values and output data comprised of one discrete value or non-numeric value;

the evolutionary adaptation type inference knowledge extracting apparatus, the apparatus operating, when the input data of the point of sales data transformed by the data format transforming section is inputted, to extract a fuzzy rule representing a tendency of physical distribution included in the point of sales data by updating in an evolutionary adaptation manner a parameter of a fuzzy rule so that an output error with respect to the input data is minimized; and an inference section for outputting an inference result by executing a fuzzy inference operation with regard to the physical distribution by means of the fuzzy rule extracted by the evolutionary adaptation type inference knowledge extracting apparatus.

The inputted POS data is transformed into the format of input/output data constituted by a combination of input data comprised of a plurality of numeric values and output data comprised of one discrete value or non-numeric value by the data format transforming section. Then, upon the input of the input data of the transformed POS data to the evolutionary adaptation type inference knowledge extracting apparatus, the parameter of the fuzzy rule is updated so that the output error with respect to the input data is minimized. Consequently, a fuzzy rule representing the tendency of the physical distribution included in the POS data is extracted. Therefore, the tendency of the physical distribution can be extracted outwardly from the evolutionary adaptation type inference knowledge extracting apparatus.

Furthermore, a fuzzy inference operation with regard to the physical distribution is executed by the inference section by means of the fuzzy rule extracted by the evolutionary adaptation type inference knowledge extracting apparatus, so that an inference result is outputted to the outside.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 5 is an explanatory view of a crossing-over operation 1 executed by a fuzzy rule individual gene manipulating section shown in FIG. 1;

FIG. 7 is an explanatory view of the crossing-over operation 2 continued from FIG. 6;

FIG. 8 is an explanatory view of the crossing-over operation 2 continued from FIG. 7;

FIG. 11 is an explanatory view of a mutational operation 2;

DETAILED DESCRIPTION OF THE PREFERRED EMBODIMENTS

The present invention will be described in detail below based on preferred embodiments thereof with reference to the accompanying drawings.

First embodiment

Figure 1:
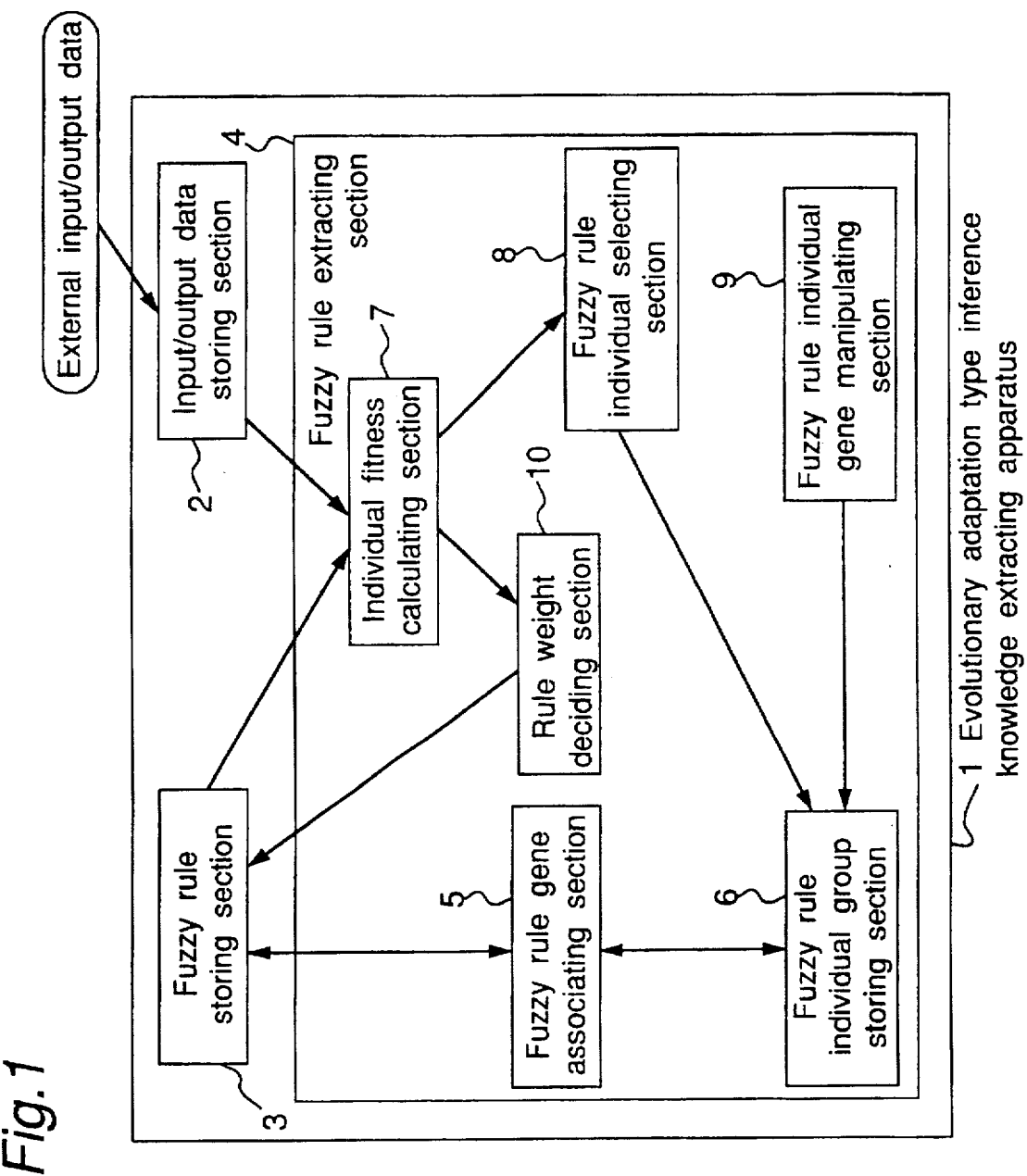
FIG. 1 is a block diagram of an evolutionary adaptation type inference knowledge extracting apparatus of the present invention.

FIG. 1 is a block diagram of an evolutionary adaptation type inference knowledge extracting apparatus 1 of the present embodiment.

The evolutionary adaptation type inference knowledge extracting apparatus 1 of the present embodiment substantially comprises an input/output data storing section 2 for storing input/output data, a fuzzy rule storing section 3 in which a plurality of fuzzy rules are stored, and a fuzzy rule extracting section 4.

The fuzzy rule extracting section 4 comprises: a fuzzy rule gene associating section 5 for associating parameters of the fuzzy rules stored in the fuzzy rule storing section 3 with genes; a fuzzy rule individual group storing section 6 mounted with a plurality of individual groups to be subjected to the associating operation via the fuzzy rule gene associating section 5; an individual fitness calculating section 7 for deciding the degree of fitness of each individual inside the fuzzy rule individual group storing section 6 according to a result of inference of the fuzzy rule associated with the individual; a fuzzy rule individual selecting section 8 for selecting an individual based on the fitness obtained in the individual fitness calculating section 7; a fuzzy rule individual gene manipulating section 9 for effecting the gene manipulation of crossing-over, mutation and so forth on each individual inside the fuzzy rule individual group storing section 6; and a rule weight deciding section 10 for deciding the corresponding fuzzy rule weight based on the fitness obtained in the individual fitness calculating section 7.

The input/output data storing section 2 stores externally inputted input/output data in a format as expressed by Equation (1).

$$\begin{aligned}
D: &= \{S_i; i = 1, \ldots, N\} \\
C: &= \{C_1, C_2, \ldots, C_k, \ldots, C_L\} \\
&\quad C_k: \text{discrete value or non-numeric value} \\
S_i &= (a_{i1}, a_{i2}, \ldots, a_{in}; c_i) \\
&\quad a_{ij} \in R, c_i \in C \ (i = 1, \ldots, N) \\
D_k &= \{S_i \in D: c_i = C_k\} \\
&\quad (k = 1, \ldots, L)
\end{aligned} \quad (1)$$

where

D: set of given input/output data $S_i$,

C: set of discrete value or non-numeric value $C_k$ $S_i$: i-th input/output data, $a_{ij}$: j-th input attribute value of i-th input/output data $S_i$, $c_i$: output value corresponding to input attribute values $a_{i1}, \ldots, a_{in}$ of i-th input/output data $S_i$, $D_k$: Set of input/output data $S_i$ where output value $c_i$ is $C_k$ in input/output data set D (set D is divided without intersection), n: amount of input attributes, N: amount of all input/output data, and L: total amount of possible output values $C_k$.

The fuzzy rule storing section 3 stores each fuzzy rule (k,l) in a format as expressed by Equation (2).

$$\begin{aligned}
&\text{if } I_1 \text{ is } F_{kl1} \text{ and } I_2 \text{ is } F_{kl2} \text{ and } \ldots \text{ and } I_n \text{ is } F_{kln}, \\
&\text{then } c \text{ is } C_k \text{ with weight } \omega_{kl} \\
&\quad (k = 1, \ldots, L \quad l = 1, \ldots, M)
\end{aligned} \quad (2)$$

where $\omega_{k1} + \ldots + \omega_{kl} + \ldots + \omega_{kM} = 1$, l: number of fuzzy rule having identical posterior part, and M: total amount of fuzzy rules having identical posterior part.

The fuzzy rule (k,l) indicates that the output c in the case where $I_1$ is $F_{kl1}$, $I_2$ is $F_{kl2}$, ..., $I_n$ is $F_{kln}$ with respect to an input vector $I=(I_1, I_2, \ldots, I_n) \in R^n$ is $C_k$, and the rule weight of the fuzzy rule (k,l) in the above case is $\omega_{kl}$. Furthermore, $F_{klj}$ in the Equation (2) represents a Gaussian type fuzzy membership function as expressed by Equation (3).

$$\begin{aligned}
F_{klj}(x) &= \exp((-1/2)(\mu_{klj} - x)^2/\sigma_{klj}^2) \\
&\quad (k = 1, \ldots, L, \ l = 1, \ldots, M \ j = 1, \ldots, n)
\end{aligned} \quad (3)$$

where $\mu_{klj}$: center of Gaussian type fuzzy membership function $F_{klj}$, and $\sigma_{klj}$: dispersion of Gaussian type fuzzy membership function $F_{klj}$.

A fitness $F_{kl}$ of the anterior part of the fuzzy rule (k,l) with respect to the input vector $I=(I_1, I_2, \ldots, I_n) \in R^n$ is calculated according to Equation (4).

$$F_{kl}(I) = \prod_j F_{klj}(l_j)$$

$$= \exp\left( (-1/2) \sum_j (\mu_{klj} - l_j)^2/\sigma_{klj}^2 \right) \quad (4)$$

$$(k=1,\ldots,L,\ l=1,\ldots,M)$$

Further, a rate $P_k$ at which the output c of all the fuzzy rule (k,l) (k=1, ..., L, l=1, ..., M) with respect to the input vector $I=(I_1, I_2, \ldots, I_n) \in R^n$ is $C_k$ is calculated according to Equation (5).

$$P_k(I) = \sum_l \omega_{kl} F_{kl}(I) / \sum_d \sum_l \omega_{dl} F_{dl}(I) \quad (5)$$

$$(k=1,\ldots,L)$$

Figures 2A, 2B:
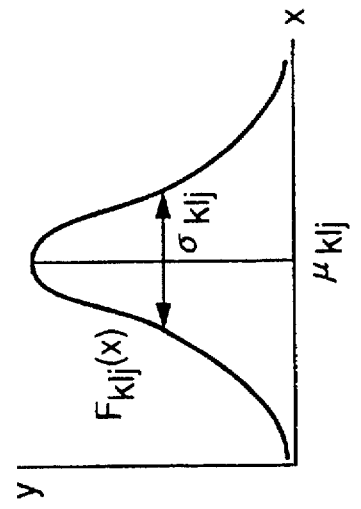
FIGS. 2A and 2B are explanatory views of an association of a fuzzy rule with individual genes in a fuzzy rule gene associating section shown in FIG. 1.

The fuzzy rule gene associating section 5 of the fuzzy rule extracting section 4 sets the other parameter based on either one of the parameter of the fuzzy rule (k,l) and the parameter of an individual $Ind_{kl}$ in a format as shown in FIGS. 2A and 2B, thereby associating both the parameters with each other.

The individual $Ind_{kl}$ has, as shown in FIGS. 2A and 2B, a string of 2n real number values formed by alternately arranging the center $\mu_{klj}$ and the dispersion $\sigma_{klj}$ of the Gaussian type fuzzy membership function $F_{klj}$ in the anterior part of the fuzzy rule (k,l) in order of the Gaussian type fuzzy membership function $F_{klj}$ (in order of j) as a gene string.

Figure 3:
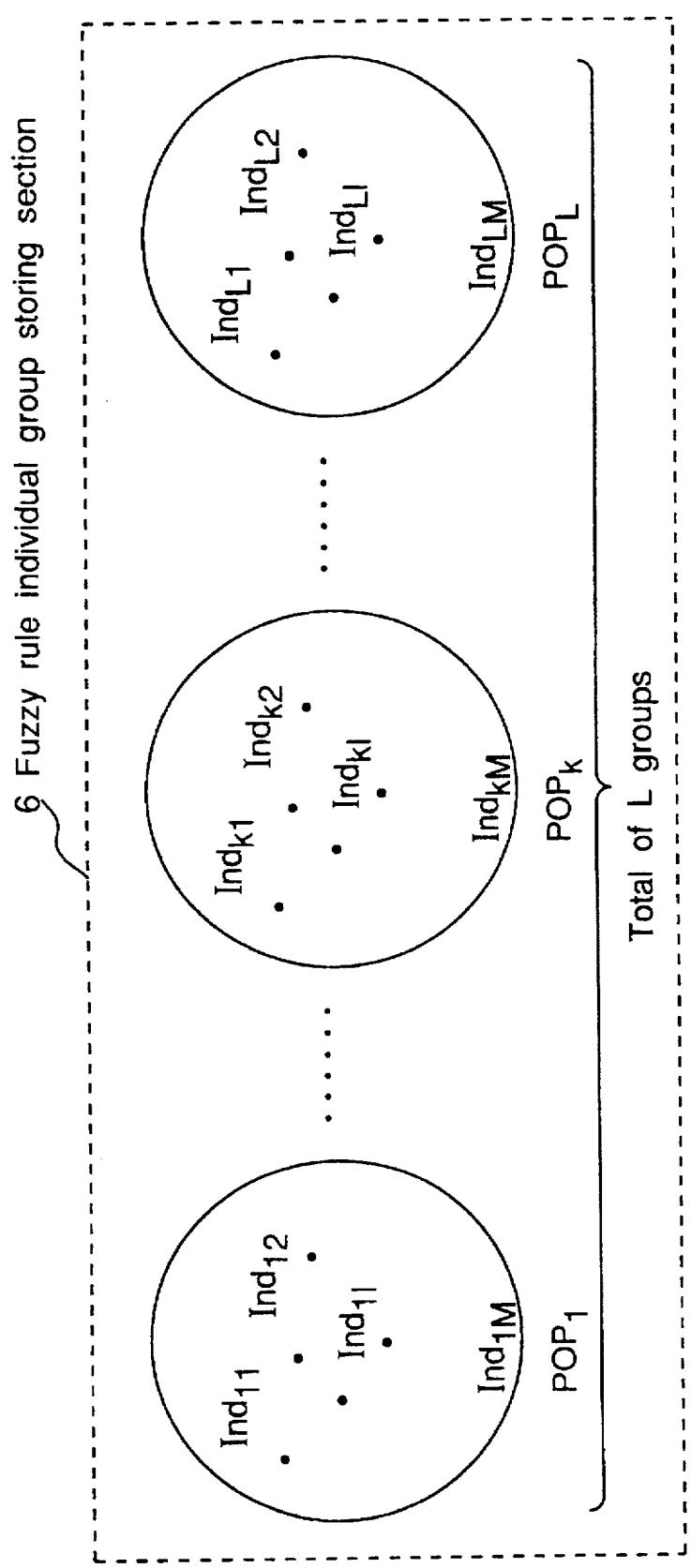
FIG. 3 is a conceptual diagram showing a construction of a fuzzy rule individual group storing section shown in FIG. 1.

The fuzzy rule individual group storing section 6 stores a plurality of groups $POP_1, \ldots, POP_k, \ldots, POP_L$ as shown in FIG. 3. To each group $POP_k$ is belonging all the individuals $Ind_{kl}$ associated with the fuzzy rule (k,l) in which the output c of the posterior part is $C_k$ by the fuzzy rule gene associating section 5 as is apparent from FIG. 2A.

The individual fitness calculating section 7 calculates an evaluation value $eval(Ind_{kl})$ and a fitness $fitness(Ind_{kl})$ in each group $POP_k$ by means of a fitness $F_{kl}(a_{i1}, a_{i2}, \ldots, a_{in})$ of the anterior part of the fuzzy rule (k,l) associated with the individual $Ind_{kl}$ relevant to the input attribute value vector $(a_{i1}, a_{i2}, \ldots, a_{in})$ of each input/output data $S_i$ stored in the input/output data storing section 2 (calculated according to the above Equation (4)) according to Equation (6) and Equation (7).

$$eval(Ind_{kl}) = \sum_i (F_{kl}(a_{i1} \cdot a_{i2}, \ldots, a_{in}) - T(S_i))^2$$

where $T(S_i) = 1$  $S_i \in D_k$ \quad (6)

$T(S_i) = 0$ otherwise, $$fitness(Ind_{kl}) = \max_l (eval(Ind_{kl})) - eval(Ind_{kl}) +$$

$$\min_l (eval(Ind_{kl})) \times sp \quad (7)$$

$$(k=1,\ldots,L,\ l=1,\ldots,M)$$

where sp: selection pressure (the greater the value is, the smaller the dispersion of fitness $fitness(ind_{kl})$ in each group is.)

The Equation (6) means that the value of the evaluation value $eval(ind_{kl})$ becomes smaller according as the fitness $F_{kl}(a_{i1}, a_{i2}, \ldots, a_{in})$ of the anterior part of the fuzzy rule (k,l) associated with the corresponding individual $Ind_{kl}$ becomes higher only for the input attribute value vector $(a_{i1}, a_{i2}, \ldots, a_{in})$ of the input/output data $S_i$ belonging to $D_k$ (i.e., the input/output data $S_i$ where the output value $c_i$ is $C_k$). The Equation (7) means that the smaller the value of the evaluation value $eval(Ind_{kl})$ in the group $POP_k$ is, the greater the value of the fitness $fitness(Ind_{kl})$ is.

The fuzzy rule individual selecting section 8 selects in a probable way from the fuzzy rule individual group storing section 6 an individual having a high fitness $fitness(Ind_{kl})$ in a roulette system as follows (i.e., the fuzzy rule (k,l) having a small output error with respect to the group D of the input/output data $S_i$) according to the fitness $fitness(ind_{kl})$ calculated by the individual fitness calculating section 7.

That is, a random number "r" having values ranging from "0" to "R" with regard to the group $POP_k$ stored in the fuzzy rule individual group storing section 6, as expressed by:

$$R = \sum_i fitness(Ind_{kl})$$

is generated, and an individual $Ind_{kt}$ representing a fitness $fitness(Ind_{kt})$ such that it satisfies the expression:

$$fitness(Ind_{k1}) + \ldots + fitness(Ind_{k(t-1)})$$

$$< r < fitness(Ind_{k1}) + \ldots + fitness(Ind_{kt})$$

with respect to the random number "r" is selected. Subsequently, the above operation is repeated M times to select a total of M individuals $Ind_{kt}$, and thereafter all the individuals in the group $POP_k$ are replaced by the selected M individuals $Ind_{kt}$. Subsequently, all the groups $POP_k$ (k=1, ..., L) are subjected to the above manipulating operation.

Figure 4:
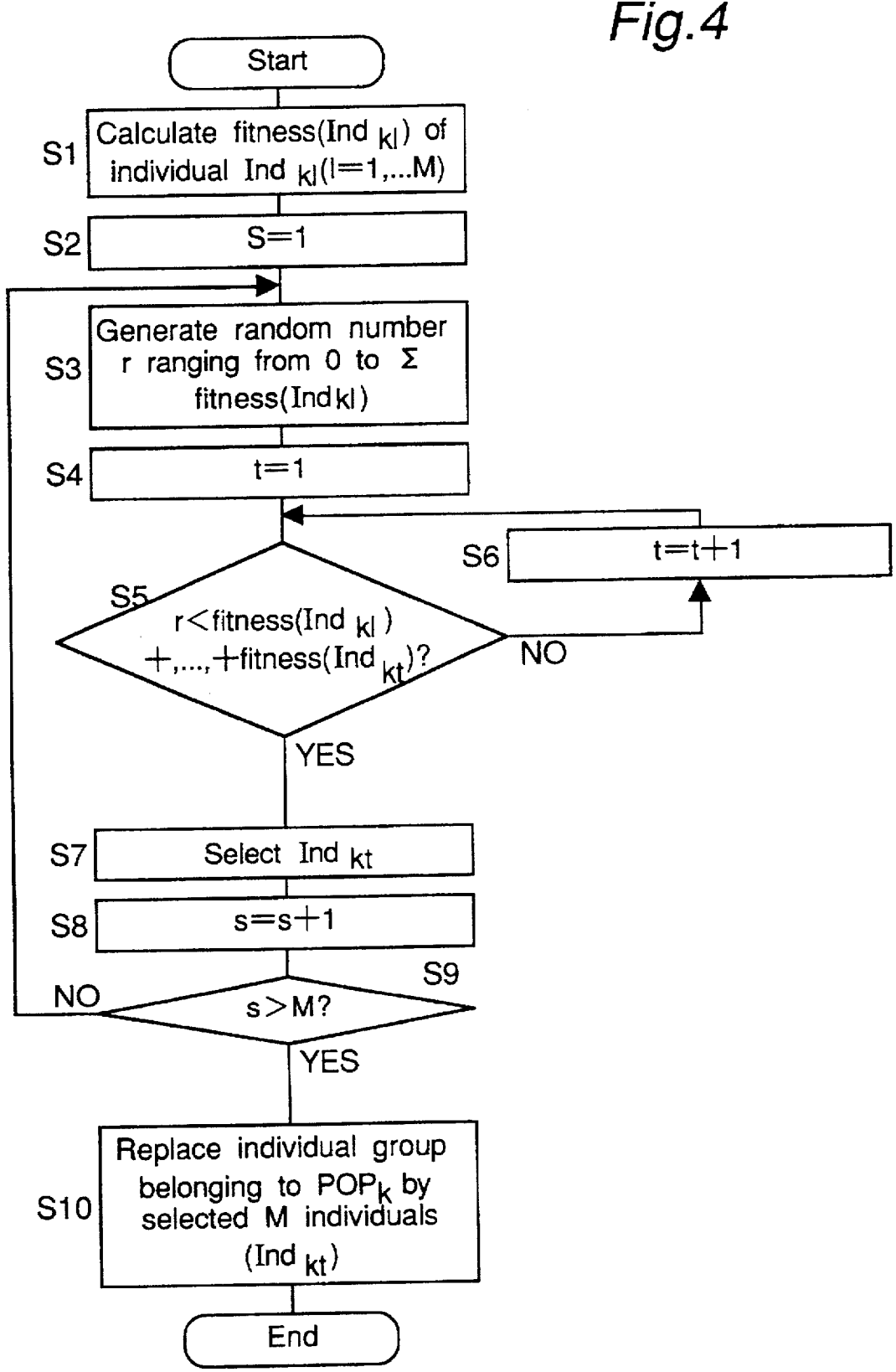
FIG. 4 is a flowchart of a high fitness individual selecting operation executed by an individual fitness calculating section and a fuzzy rule individual selecting section shown in FIG. 1.

FIG. 4 is a flowchart of a high fitness individual selecting operation relevant to each group $POP_k$ executed by the individual fitness calculating section 7 and the fuzzy rule individual selecting section 8.

The high fitness individual selecting operation will be described in detail below with reference to FIG. 4.

In step S1, the fitness $fitness(Ind_{kl})$ of all the individuals $Ind_{kl}$ (l=1, ..., M) are calculated by the individual fitness calculating section 7 with regard to each input/output data $S_i \in D$ read from the input/output data storing section 2 according to the Equation (6) and the Equation (7).

Subsequently, the program flow proceeds to an operation of the fuzzy rule individual selecting section 8.

In step S2, an initial value "1" is set to an individual selection frequency s.

In step S3, a random number r ranging from "0" to "$R(=\Sigma fitness(Ind_{kl}))$" is generated.

In step S4, an initial value "1" is set to a fitness number t.

In step S5, it is decided whether or not the value of the random number r generated in step S3 is smaller than the sum of $fitness(Ind_{k1}) + \ldots + fitness(Ind_{kt})$. Consequently, when the former is smaller than the latter, the program flow proceeds to step S7. Otherwise, the program flow proceeds to step S6.

In step S6, the fitness number t is incremented, and then the program flow returns to step S5.

In step S7, the individual $Ind_{kt}$ representing the fitness $fitness(Ind_{kt})$ is selected, and the fitness number t is stored in an internal memory.

In step S8, the individual selection frequency s is incremented.

In step S9, it is decided whether or not the content of the individual selection frequency s is greater than the total amount M of the individuals $Ind_{kl}$ belonging to the group $POP_k$. Consequently, when the former is greater than the latter, the program flow proceeds to step S10. Otherwise, the program flow returns to step S3 to select the next individual $Ind_{kt}$.

In step S10, all the M individuals $Ind_{kl}$ (i.e., individual $Ind_{kt}$) which have the same inter-group numbers l as the M fitness numbers t stored in step S7 and belong to the group $POP_k$ are replaced. Thereafter, the high fitness individual selecting operation is completed.

Figure 10:
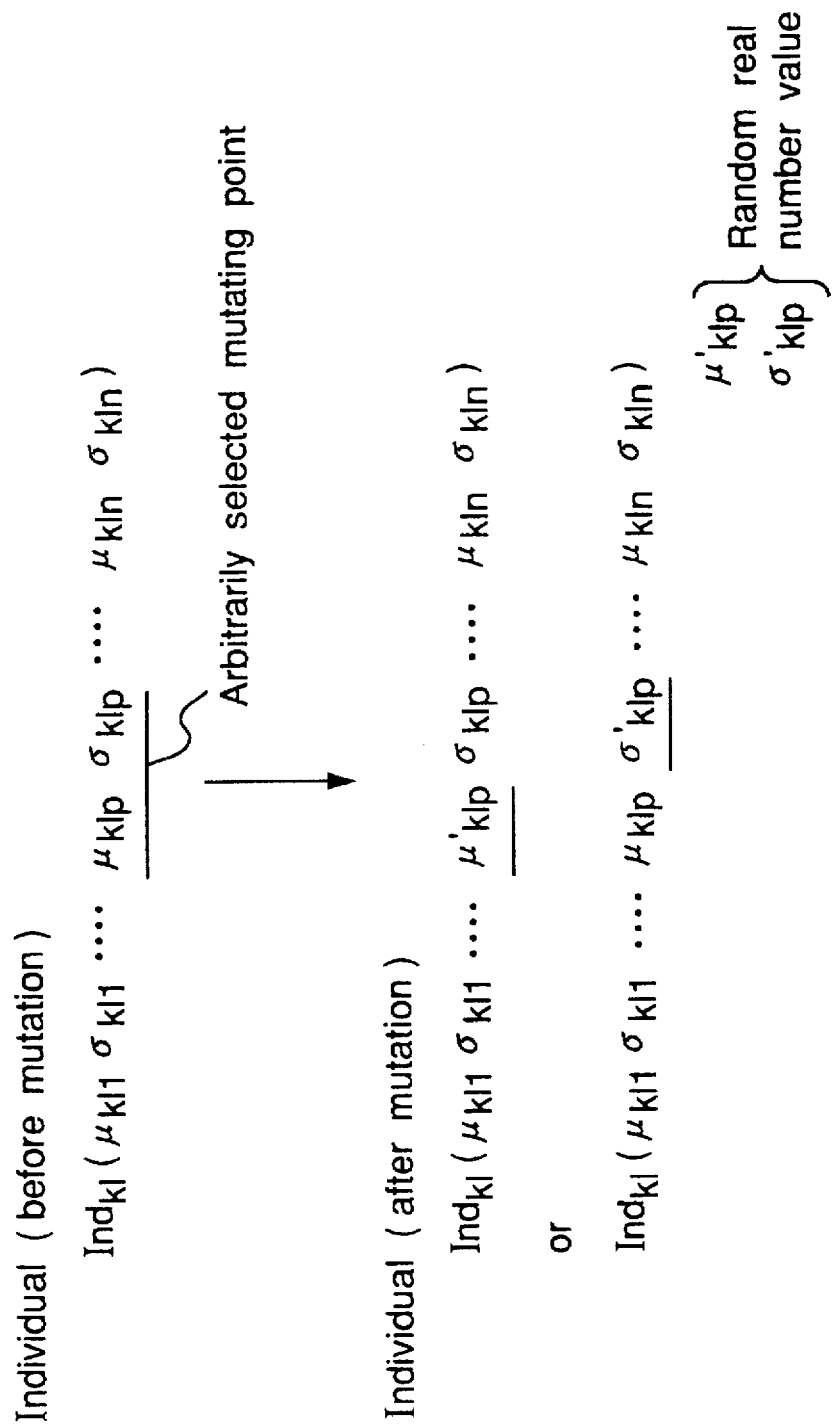
FIG. 10 is an explanatory view of a mutational operation 1.

The fuzzy rule individual gene manipulating section 9 effects the above crossing-over gene manipulating operation according to a procedure as shown in FIGS. 5 through 8 as well as a mutational gene manipulating operation according to a procedure as shown in FIGS. 10 and 11 on the fuzzy rule individual group storing section 6 so as to generate a new individual.

The crossing-over gene manipulating operation and the mutational gene manipulating operation will be described in detail below.

The crossing-over gene manipulating operation is an operation for generating new one (crossing-over operation 1) or two (crossing-over operation 2) offspring individuals from two arbitrary parent individuals belonging to each group $POP_k$ stored in the fuzzy rule individual group storing section 6 as shown in FIGS. 5 through 8.

In the crossing-over operation 1 shown in FIG. 5, as is evident from Expressions (8), a real number value constituting the gene of each offspring individual is given by an average value of two real number values constituting the genes of the corresponding two parent individuals.

Parent individuals (identical group $POP_k$):

$$Ind_{kl}1: (\mu_{kl}1_1 \; \sigma_{kl}1_1 \ldots \mu_{kl}1_n \; \sigma_{kl}1_n)$$
and
$$Ind_{kl}2: (\mu_{kl}2_1 \; \sigma_{kl}2_1 \ldots \mu_{kl}2_n \; \sigma_{kl}2_n)$$
↓
Offspring individuals:
$$((\mu_{kl}1_1 + \mu_{kl}2_1)/2 \quad (\sigma_{kl}1_1 + \sigma_{kl}2_1)/2 \ldots$$
$$(\mu_{kl}1_n + \mu_{kl}2_n)/2 \quad (\sigma_{kl}1_n + \sigma_{kl}2_n)/2)) \quad (8)$$

Figure 6:
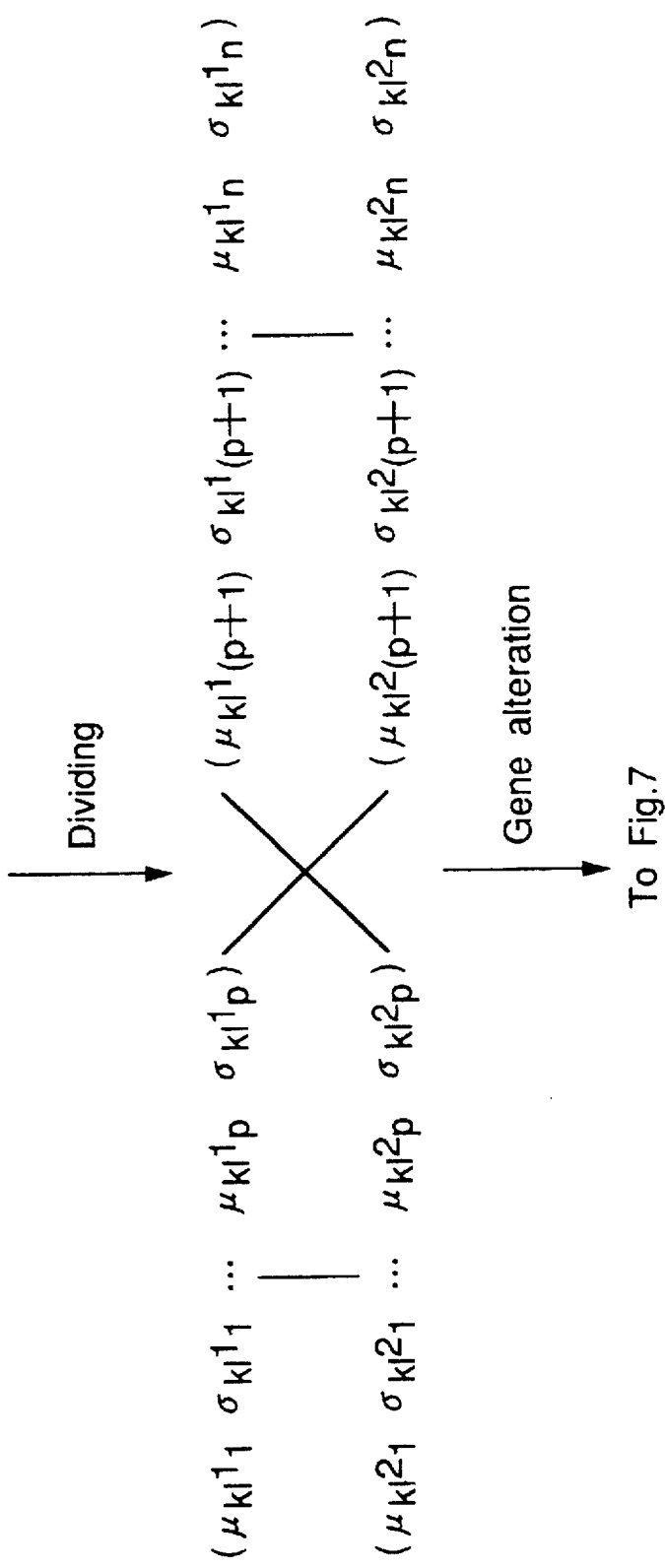
FIG. 6 is an explanatory view of a crossing-over operation 2.

On the other hand, in the crossing-over operation 2 shown in FIGS. 6 through 8, as is evident from Expressions (9), genes of new two offspring individuals are generated by dividing two parent individuals in between genes selected at random and manipulating the respective divided gene strings to combine them with each other.

Parent individuals (identical group $POP_k$):

Parent individual 1:
$$Ind_{kl}1: (\mu_{kl}1_1 \; \sigma_{kl}1_1 \ldots \mu_{kl}1_p \; \sigma_{kl}1_p \ldots \mu_{kl}1_n \; \sigma_{kl}1_n)$$
and
Parent individual 2:
$$Ind_{kl}2: (\mu_{kl}2_1 \; \sigma_{kl}2_1 \ldots \mu_{kl}2_p \; \sigma_{kl}2_p \ldots \mu_{kl}2_n \; \sigma_{kl}2_n)$$
↓
Offspring individuals:
Offspring individual 1:
$$(e1(\mu_{kl}1_1, \mu_{kl}2_1) \; e1(\sigma_{kl}1_1, \sigma_{kl}2_1)$$
$$\ldots e1(\mu_{kl}1_p, \mu_{kl}2_p) \; e1(\sigma_{kl}1_p, \sigma_{kl}2_p)$$
$$\ldots e2(\mu_{kl}1_{(p+1)}, \mu_{kl}2_{(p+1)}) \; e2(\sigma_{kl}1_{(p+1)}, \sigma_{kl}2_{(p+1)})$$
$$\ldots e2(\mu_{kl}1_n, \mu_{kl}2_n) \; e2(\sigma_{kl}1_n, \sigma_{kl}2_n))$$
and
Offspring individual 2:
$$(m1(\mu_{kl}1_1, \mu_{kl}2_1) \; m1(\sigma_{kl}1_1, \sigma_{kl}2_1)$$
$$\ldots m1(\mu_{kl}1_p, \mu_{kl}2_p) \; m1(\sigma_{kl}1_p, \sigma_{kl}2_p)$$
$$\ldots m2(\mu_{kl}1_{(p+1)}, \mu_{kl}2_{(p+1)}) \; m2(\sigma_{kl}1_{(p+1)}, \sigma_{kl}2_{(p+1)})$$
$$\ldots m2(\mu_{kl}1_n, \mu_{kl}2_n) \; m2(\sigma_{kl}1_n, \sigma_{kl}2_n)) \quad (9)$$

where
$$e1(x,y) = x - (1/a)|x - y| \; (x < y)$$
$$x + (1/a)|x - y| \; (x \geq y)$$
$$e2(x,y) = y + (1/a)|x - y| \; (x < y)$$
$$y - (1/a)|x - y| \; (x \geq y)$$
$$m1(x,y) = x + (1/a)|x - y| \; (x < y)$$
$$x - (1/a)|x - y| \; (x \geq y)$$
$$m2(x,y) = y - (1/a)|x - y| \; (x < y)$$
$$y + (1/a)|x - y| \; (x \geq y)$$

($a$: natural number not smaller than 3)
where P: dividing point selected at random.

In detail, among the two offspring individuals generated by the Expressions (9), one offspring individual has genes expressed by real number values generated in such a way that the real number values of a fore half of the parent individual 1 divided in two sections and the real number values of a hind half of the parent individual 2 divided in two sections are respectively put apart from an average value of the real number values of the corresponding genes of the parent individuals 1 and 2. The other offspring individual has genes expressed by real number values generated in such a way that the real number values of a fore half of the divided parent individual 1 and the real number values of a hind half of the divided parent individual 2 are respectively put closer to an average value of the real number values of the corresponding genes of the parent individuals 1 and 2.

Figure 9:
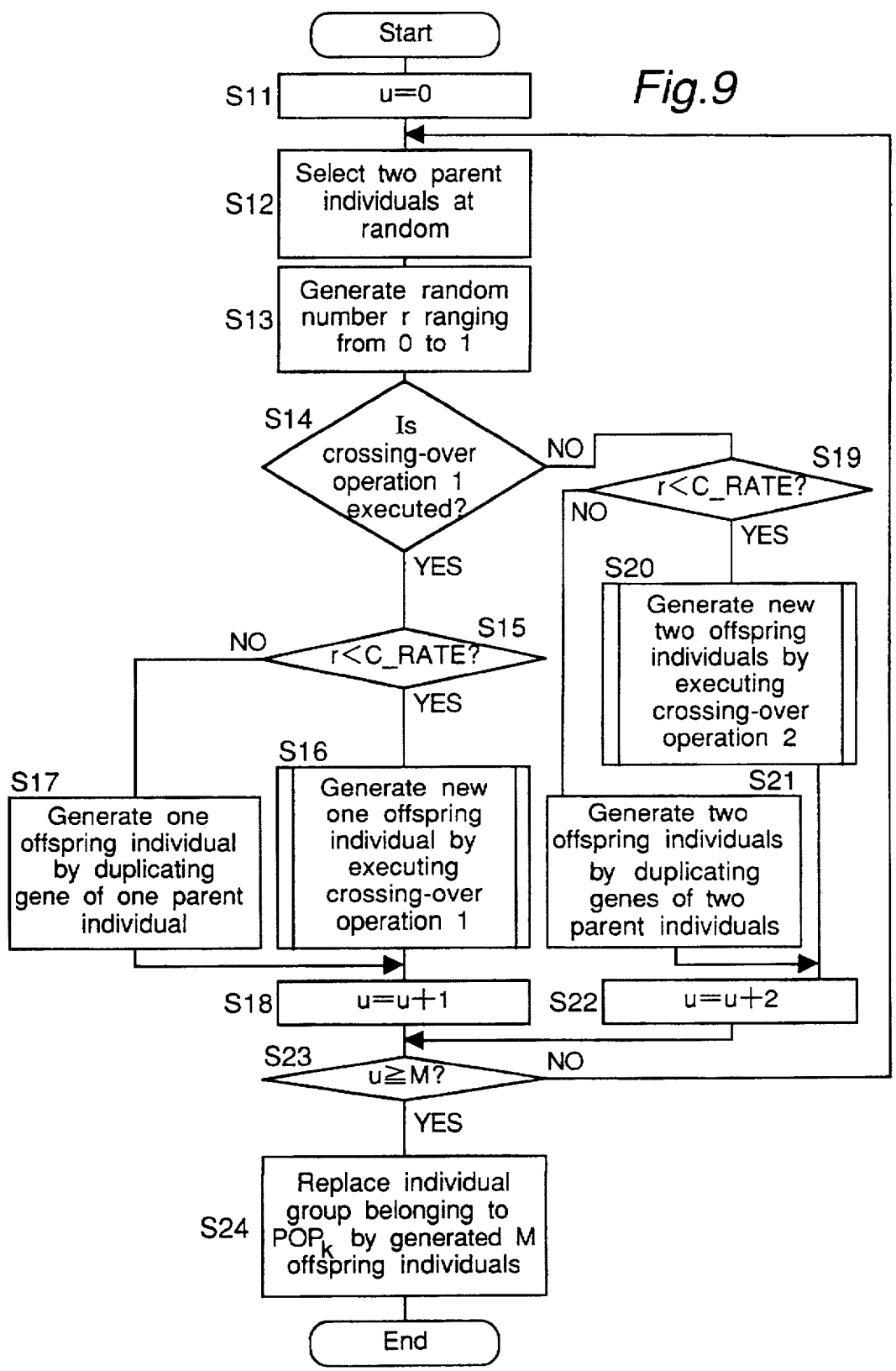
FIG. 9 is a flowchart of a crossing-over gene manipulating operation executed by the fuzzy rule individual gene manipulating section shown in FIG. 1.

FIG. 9 is a flowchart of the crossing-over gene manipulating operation for each group $POP_k$ executed by the fuzzy rule individual gene manipulating section 9.

The crossing-over gene manipulating operation will be described in detail with reference to FIG. 9.

In step S11, an initial value "0" is set to an offspring individual amount u.

In step S12, two individuals (parent individuals) are selected at random from an identical group $POP_k$.

In step S13, a random number "r" within a range from "0" to "1" is generated.

In step S14, it is decided whether or not the above "crossing-over operation 1" is to be effected based on an external command. Consequently, when the crossing-over operation 1 is to be effected, the program flow proceeds to step S15. Otherwise (i.e., when the above "crossing-over operation 2" is to be effected), the program flow proceeds to step S19.

In step S15, it is decided whether or not the value of the random number r generated in the above step S13 is smaller than a crossing-over rate C RATE. Consequently, when the former is smaller than the latter, the program flow proceeds to step S16. Otherwise, the program flow proceeds to step S17.

In step S16, the crossing-over operation 1 is effected according to the Expressions (8) to generate one offspring individual from the two parent individuals selected in step S12, and thereafter, the program flow proceeds to step S18.

In step S17, one of the two parent individuals selected in step S12 is selected, and the gene of the selected parent individual is duplicated to generate one offspring individual.

In step S18, the offspring individual amount u is incremented by one, and the total amount of the generated offspring individuals is counted. Thereafter, the program flow proceeds to step S23.

In step S19, it is decided whether or not the value of the random number r generated in step S13 is smaller than the crossing-over rate C_RATE. Consequently, when the former is smaller than the latter, the program flow proceeds to step S20. Otherwise, the program flow proceeds to step S21.

In step S20, the crossing-over operation 2 is effected according to the Expressions (9) to generate two offspring individuals from the two parent individuals selected in step S12, and thereafter, the program flow proceeds to step S22.

In step S21, the genes of the two parent individuals selected in step S12 are duplicated to generate two offspring individuals.

In step S22, the offspring individual amount u is incremented by two, and the total amount of the generated offspring individuals is counted.

In step S23, it is decided whether or not the content of the offspring individual amount u is not smaller than the inter-group individual amount "M". Consequently, when the offspring individual amount u is not smaller than the inter-group individual amount "M", the program flow proceeds to step S24. Otherwise, the program flow returns to step S12 to proceed to the subsequent crossing-over processing operation.

In step S24, all the individuals belonging to the group $POP_k$ are replaced among the group of the offspring individuals generated in step S16, step S17, step S20 and step S21. Thereafter, the crossing-over gene manipulating operation is completed.

The mutational operation effected in the mutational gene manipulating operation includes a mutational operation 1 and a mutational operation 2.

The mutational operation 1 is to select an arbitrary gene in the gene string of each individual $Ind_{kl}$ as a mutating point as shown in FIG. 10 and replace the real number value of the selected gene by a random real number value.

On the other hand, the mutational operation 2 is to select an arbitrary gene in the gene string of each individual $Ind_{kl}$ as a mutating point as shown in FIG. 11, and replace a partial gene string having a gene amount 2h subsequent to the selected gene by a mutation use gene string VIRUS having the same gene amount 2h. The mutation use gene string VIRUS in the above case is so constructed that a partial gene string having the gene amount 2h subsequent to an arbitrary point in another individual within an identical group or another group in which the partial gene string has been replaced through the previous mutation is stored. Then, the gene string of the mutation use gene string VIRUS obtained through the mutating operation is replaced with a gene string having the gene amount 2h prior to the replacement in each individual $Ind_{kl}$ subjected to the present mutating operation. In short, the partial gene string subsequent to the mutating point is replaced by the mutation use gene string VIRUS.

It is to be noted that the mutating point is selected in units of a pair of parameters (i.e., in units of two real numbers $\mu_{kl}$ and $\sigma_{kl}$) in the Gaussian type fuzzy membership function $F_{klj}$ of the above fuzzy rule (k,l).

Figure 12:
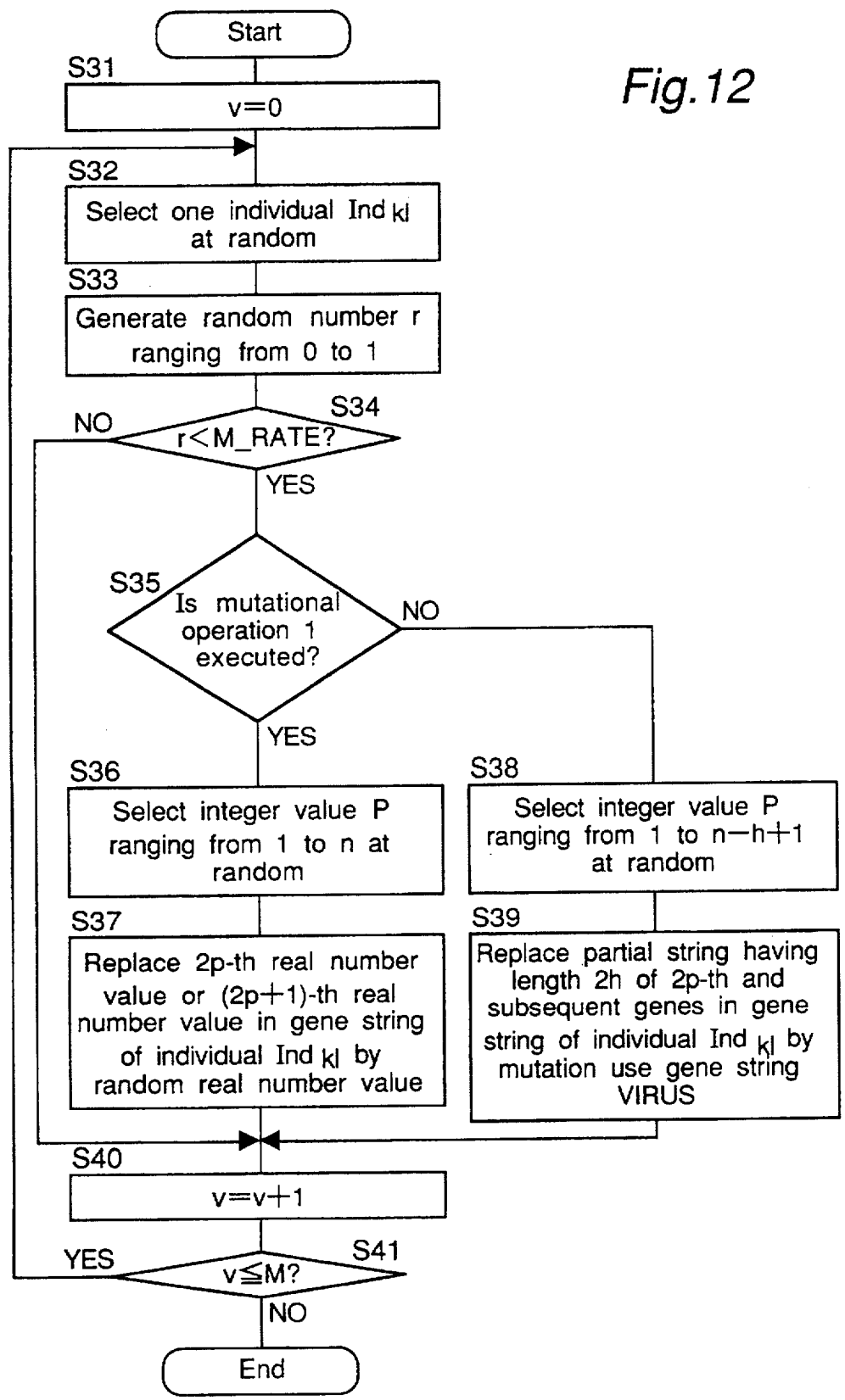
FIG. 12 is a flowchart of a mutational gene manipulating operation executed by the fuzzy rule individual gene manipulating section shown in FIG. 1.

FIG. 12 is a flowchart of a mutational gene manipulating operation for each group $POP_k$ executed by the fuzzy rule individual gene manipulating section 9.

The mutational gene manipulating operation will be described in detail with reference to FIG. 12.

In step S31, an initial value "1" is set to a mutation objective individual number v.

In step S32, one individual $Ind_{kl}$ is selected at random.

In step S33, a random number r within a range from "0" to "1" is generated.

In step S34, it is decided whether or not the value of the random number r generated in step S32 is smaller than a mutation rate M_RATE. Consequently, when the former is smaller than the latter, the program flow proceeds to step S35. Otherwise, the program flow proceeds to step S40.

In step S35, it is decided whether or not the above "mutational operation 1" is to be effected based on an external command. Consequently, when the "mutational operation 1" is effected, the program flow proceeds to step S36. Otherwise (i.e., when the above "mutational operation 2" is effected), the program flow proceeds to step S38.

In step S36, an integer value "p" ranging from "1" to "n" is selected at random.

In step S37, with regard to the integer value "p" selected in step S36, a 2p-th real number value or (2p+1)-th real number value in the gene string of the individual $Ind_{kl}$ selected in step S32 is replaced by a random real number value. Thereafter, the program flow proceeds to step S40.

In step S38, an integer value "p" ranging from "1" to "n−h+1" is selected at random.

In step S39, with regard to the integer value selected in step S38, a partial gene string having a gene amount 2h of the 2p-th and subsequent genes in the gene string of the individual $Ind_{kl}$ selected in step S32 is replaced by the mutation use gene string VIRUS.

In step S40, the mutation objective individual number v is incremented.

In step S41, it is decided whether or not the content of the mutation objective individual number v is not greater than the inter-group individual amount "M". Consequently, when the content of the mutation objective individual number v is not greater than the inter-group individual amount "M", the program flow returns to step S32 to proceed to the subsequent mutating operation. Otherwise, when the content of the mutation objective individual number v is greater than the inter-group individual amount "M", the mutating operation is completed.

The rule weight deciding section 10 normalizes a weight $\omega_{kl}$ of the fuzzy rule (k,l) every group $POP_k$ according to Equation (10) based on the fitness fitness($Ind_{kl}$) calculated by the individual fitness calculating section 7 after completing the high fitness individual selecting operation by the fuzzy rule individual selecting section 8 and the gene manipulating operation by the fuzzy rule individual gene manipulating section 9.

$$\omega_{kl} = \text{fitness}(Ind_{kl}) / \sum_d \text{fitness}(Ind_{kd}) \quad (10)$$

$$(k = 1, \ldots, L, \quad l = 1, \ldots, M)$$

The fuzzy rule extracting section 4 controls the fuzzy rule gene associating section 5, individual fitness calculating section 7, fuzzy rule individual selecting section 8, fuzzy rule individual gene manipulating section 9, rule weight deciding section 10 and so forth to execute the following evolutionary adaptation operation.

Figure 13:
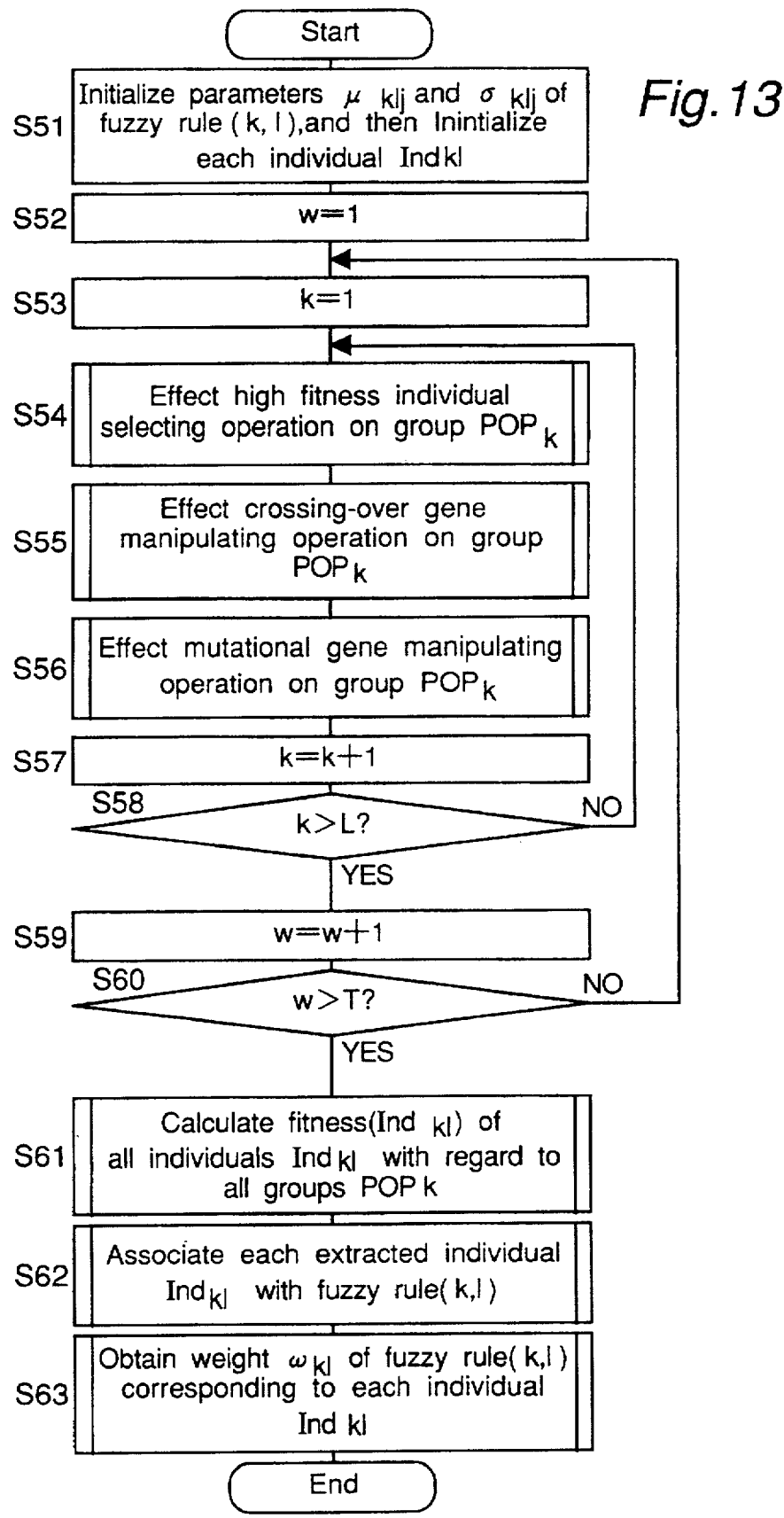
FIG. 13 is a flowchart of an evolutionary adaptation operation executed by a fuzzy rule extracting section shown in FIG. 1.

FIG. 13 is a flowchart of the evolutionary adaptation operation to be executed by the fuzzy rule extracting section 4. The evolutionary adaptation operation will be described in detail below with reference to FIG. 13.

In step S51, parameters $\mu_{klj}$ and $\sigma_{klj}$ (j=1, ..., n) of the Gaussian type fuzzy membership function $F_{jkl}$ according to the fuzzy rule (k,l) (k=1, ..., L, l=1, ..., M) stored in the fuzzy rule storing section 3 are initialized by a random number. Thereafter, the fuzzy rule gene associating section 5 is controlled to set genes $\mu_{klj}$ and $\sigma_{klj}$ of each individual $Ind_{kl}$ according to the parameters $\mu_{klj}$ and $\sigma_{klj}$ of the initialized fuzzy rule (k,l), so that each individual $Ind_{kl}$ in each group $POP_k$ are initialized.

In step S52, an initial value "1" is set to a frequency of alteration of generations w.

In step S53, an initial value "1" is set to a number k of a group to be subject to the evolutionary adaptation operation (the number being referred to as a group number hereinafter).

In step S54, the individual fitness calculating section 7 and the fuzzy rule individual selecting section 8 are controlled to effect a high fitness individual selecting operation on the group $POP_k$ according to the flowchart shown in FIG. 4.

In step S55, the fuzzy rule individual gene manipulating section 9 is controlled to effect the crossing-over gene manipulating operation on the group $POP_k$ according to the flowchart shown in FIG. 9.

In step S56, the fuzzy rule individual gene manipulating section 9 is controlled to effect the mutational gene manipulating operation on the group $POP_k$ according to the flowchart shown in FIG. 12.

In step S57, the content of the group number k is incremented.

In step S58, it is decided whether or not the content of the group number k is greater than a total amount L of the groups. Consequently, when the former is greater than the latter, the program flow proceeds to step S59. Otherwise, the program flow returns to step S54 to proceed to the evolutionary adaptation operation for the subsequent group.

In step S59, the content of the frequency of alteration of generations w is incremented.

In step S60, it is decided whether or not the content of the frequency of alteration of generations w is greater than a maximum frequency of alteration of generations "T". Consequently, when the former is greater than the latter, the program flow proceeds to step S61. Otherwise, the program flow returns to step S53 to proceed to the evolutionary adaptation operation in the subsequent alteration of generations for all the groups $POP_k$.

In step S61, the individual fitness calculating section 7 is controlled to calculate the fitness fitness($Ind_{kl}$) of all the individuals $Ind_{kl}$ (k=1, ..., L, l=1, ..., M) with regard to all the groups $POP_k$ stored in the fuzzy rule individual group storing section 6 according to the Equation (6) and Equation (7).

In step S62, the fuzzy rule gene associating section 5 is controlled to set the parameters $\mu_{klj}$ and $\sigma_{klj}$ of the fuzzy rule (k,l) in the fuzzy rule storing section 3 according to the genes $\mu_{klj}$ and $\sigma_{klj}$ of each individual $Ind_{kl}$ extracted through the high fitness individual selecting operation, the crossing-over gene manipulating operation and the mutational gene manipulating operation. Thus, the extracted individual $Ind_{kl}$ and the fuzzy rule (k,l) are associated with each other.

In step S63, the rule weight deciding section 10 is controlled to calculate the weight $\omega_{kl}$ of the fuzzy rule (k,l) that has undergone the evolutionary adaptation operation according to the Equation (10) based on the fitness fitness ($ind_{kl}$) of all the individuals $Ind_{kl}$ (k=1, ..., L, l=1, ..., M) calculated in step S61.

Thereafter, the evolutionary adaptation operation is completed.

A new group of the fuzzy rules (k,l) depending on the genes (i.e., the parameters $\mu_{klj}$ and $\sigma_{klj}$) of the individual $Ind_{kl}$ extracted through the high fitness individual selecting operation, the crossing-over gene manipulating operation and the mutational gene manipulating operation in the evolutionary adaptation operation as described above have been evolved through alteration of generations thereof into rules having a small output error with respect to the set D of the given input/output data $S_i$ because each extracted individual $Ind_{kl}$ has been obtained through the stochastic selection of individuals having a high fitness and the gene manipulating operation executed every group $POP_k$.

Further, the evolutionary adaptation operation by the fuzzy rule extracting section 4 can be additionally executed every time a new input/output data $S_i$ is externally added to the input/output data storing section 2 (i.e., it can be additionally evolutionarily adapted). Therefore, according to the present embodiment, even when the tendency owned by the set D of the input/output data $S_i$ dynamically changes, the above tendency can be adaptively extracted as a fuzzy rule by being additionally evolutionarily adapted.

As described above, according to the present embodiment, in the fuzzy rule individual group storing section 6 of the fuzzy rule extracting section 4, there is stored as a group $POP_k$ the individuals $Ind_{kl}$ which have the string of the parameters $\mu_{klj}$ and $\sigma_{klj}$ of each Gaussian type membership function $F_{klj}$ in the anterior part of the fuzzy rule (k,l) stored in the fuzzy rule storing section 3, and are associated with the fuzzy rule (k,l) where the output c of the posterior part is $C_k$ by the fuzzy rule gene associating section 5.

Then, the fuzzy rule extracting section 4 controls the fuzzy rule gene associating section 5, individual fitness calculating section 7, fuzzy rule individual selecting section 8, fuzzy rule individual gene manipulating section 9 and rule weight deciding section 10 to execute the evolutionary adaptation operation, so that the fuzzy rule (k,l) which has been evolutionarily adapted to the set of the input/output data $S_i$ stored in the input/output data storing section 2 is extracted.

In the above case, the fuzzy rule individual selecting section 8 stochastically selects each individual $Ind_{kl}$ associated with the fuzzy rule (k,l) having a high fitness $F_{kl}(a_{i1}, a_{i2}, \ldots, a_{in})$ to the input/output data $S_i$ from the fuzzy rule individual group storing section 6 based on the fitness fitness($Ind_{kl}$) calculated by the individual fitness calculating section 7.

Further, through the above crossing-over gene manipulating operation, the fuzzy rule individual gene manipulating section 9 executes either the crossing-over operation 1 for expressing the real number value constituting each gene of each individual by an average value of the two real number values constituting the corresponding genes of two parent individuals or the crossing-over operation 2 for providing genes of new two offspring individuals by manipulating the gene strings obtained by dividing two parent individuals in between genes selected at random and thereafter combining them. Furthermore, through the mutational gene manipulating operation, the fuzzy rule individual gene manipulating section 9 executes either the mutational operation 1 for replacing the real number value of a gene arbitrarily selected in the gene string of an individual with a random real number value or the mutational operation 2 for replacing the partial gene string subsequent to an arbitrarily selected gene in the gene string of an individual with the mutation use gene string VIRUS.

Then, the fuzzy rule gene associating section 5 sets the parameters $\mu_{klj}$ and $\sigma_{klj}$ of the fuzzy rule (k,l) according to the genes $\mu_{klj}$ and $\sigma_{klj}$ of each individual $Ind_{kl}$ obtained by effecting the crossing-over and mutational gene manipulating operations by the fuzzy rule individual gene manipulating section 9 on each individual $Ind_{kl}$ associated with the fuzzy rule (k,l) having a high degree of fitness to the input/output data $S_i$ obtained by the fuzzy rule individual selecting section 8.

The thus generated fuzzy rule (k,l) is associated with each individual $Ind_{kl}$ having a high degree of fitness fitness($Ind_{kl}$) to the input/output data $S_i$.

The individual fitness calculating section 7 calculates the fitness fitness($ind_{kl}$) to the input/output data $S_i$ with regard to the fuzzy rule (k,l) generated as above. Then, the rule weight deciding section 10 calculates the weight $\omega_{kl}$ of the fuzzy rule (k,l) based on the fitness fitness($Ind_{kl}$).

The thus extracted fuzzy rule (k,l) and its weight $\omega_{kl}$ are stored in the fuzzy rule storing section 3.

As the result of the above operation, the fuzzy rule (k,l) inside the fuzzy rule storing section 3 has been adoptively evolved to the fuzzy rule (k,l) having a high fitness fitness ($Ind_{kl}$) to the input/output data $S_i$ stored in the input/output data storing section 2 and a weight $\omega_{kl}$ corresponding to the fitness fitness($Ind_{kl}$).

In short, the fuzzy rule (k,l) extracted by the fuzzy rule extracting section 4 has been evolutionarily adapted so that the output error with respect to the input/output data $S_i$ is minimized.

Furthermore, the fuzzy rule (k,l) that has been adaptively evolved as above has a high fitness fitness($Ind_{kl}$) to the input/output data $S_i$. In other words, the fuzzy rule (k,l) has a high fitness $F_{kl}(a_{i1}, a_{i2}, \ldots, a_{in})$ to the anterior part of the input/output data $S_i$ and sufficiently expresses the input attribute value vector $(a_{i1}, a_{i2}, \ldots, a_{in})$ by the Gaussian type membership function $F_{klj}$. That is, it can be said that the fuzzy rule (k,l) evolutionarily adapted as above expresses the regularity of the input/output data $S_i$.

Furthermore, the regularity of the input/output data $S_i$ according to the fuzzy rule (k,l) is expressed by the evolutionary adaptation of the input/output data $S_i$. Therefore, when the regularity owned by the input/output data $S_i$ dynamically changes, by executing the evolutionary adaptation operation by the fuzzy rule extracting section 4 upon the occurrence of the change, the fuzzy rule (k,l) expressing the regularity of the input/output data $S_i$ is consistently stored in the fuzzy rule storing section 3.

Second embodiment

The present embodiment is related to a fuzzy inference apparatus for executing fuzzy inference by means of a fuzzy rule extracted through evolutionary adaptation operation with respect to the change of input/output data by the evolutionary adaptation type inference knowledge extracting apparatus 1 of the first embodiment.

Figure 14:
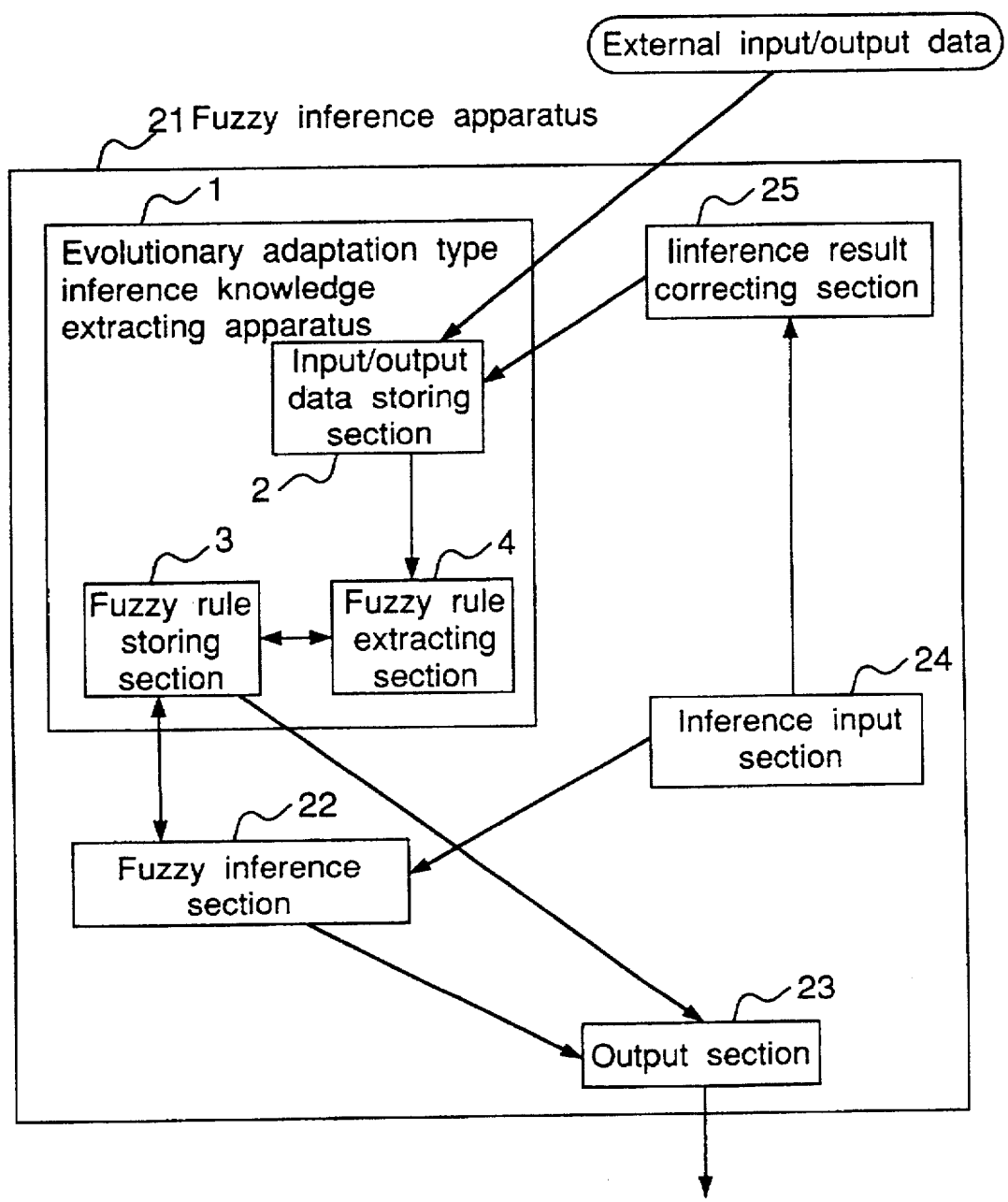
FIG. 14 is a schematic view of a fuzzy inference apparatus employing the evolutionary adaptation type inference knowledge extracting apparatus shown in FIG. 1.

FIG. 14 is a schematic view of the fuzzy inference apparatus of the present embodiment.

The fuzzy inference apparatus 21 comprises: the evolutionary adaptation type inference knowledge extracting apparatus 1 of the first embodiment; a fuzzy inference section 22 for executing fuzzy inference by means of the evolutionarily adapted fuzzy rule (k,l) that has been extracted by the evolutionary adaptation type inference knowledge extracting apparatus 1 and stored in the fuzzy rule storing section 3; an output section 23 for outputting the result of inference executed by the fuzzy inference section 22 as well as the fuzzy rule (k,l) extracted by the evolutionary adaptation type inference knowledge extracting apparatus 1; an inference input section 24 for inputting numeric data for inference to the fuzzy inference section 22; and an inference result correcting section 25 for generating an input/output data comprised of corrected data for the inference result of the fuzzy inference section 22 and the used numeric data and transferring the data to the input/output data storing section 2 of the evolutionary adaptation type inference knowledge extracting apparatus 1.

Also, the evolutionary adaptation type inference knowledge extracting apparatus 1 includes the input/output data storing section 2, fuzzy rule storing section 3, fuzzy rule extracting section 4, fuzzy rule gene associating section 5, fuzzy rule individual group storing section 6, individual fitness calculating section 7, fuzzy rule individual selecting section 8, fuzzy rule individual gene manipulating section 9 and rule weight deciding section 10 as shown in FIG. 1. It is to be noted that the fuzzy rule gene associating section, fuzzy rule individual group storing section, individual fitness calculating section, fuzzy rule individual selecting section, fuzzy rule individual gene manipulating section and rule weight deciding section are not shown in FIG. 14.

Figure 15:
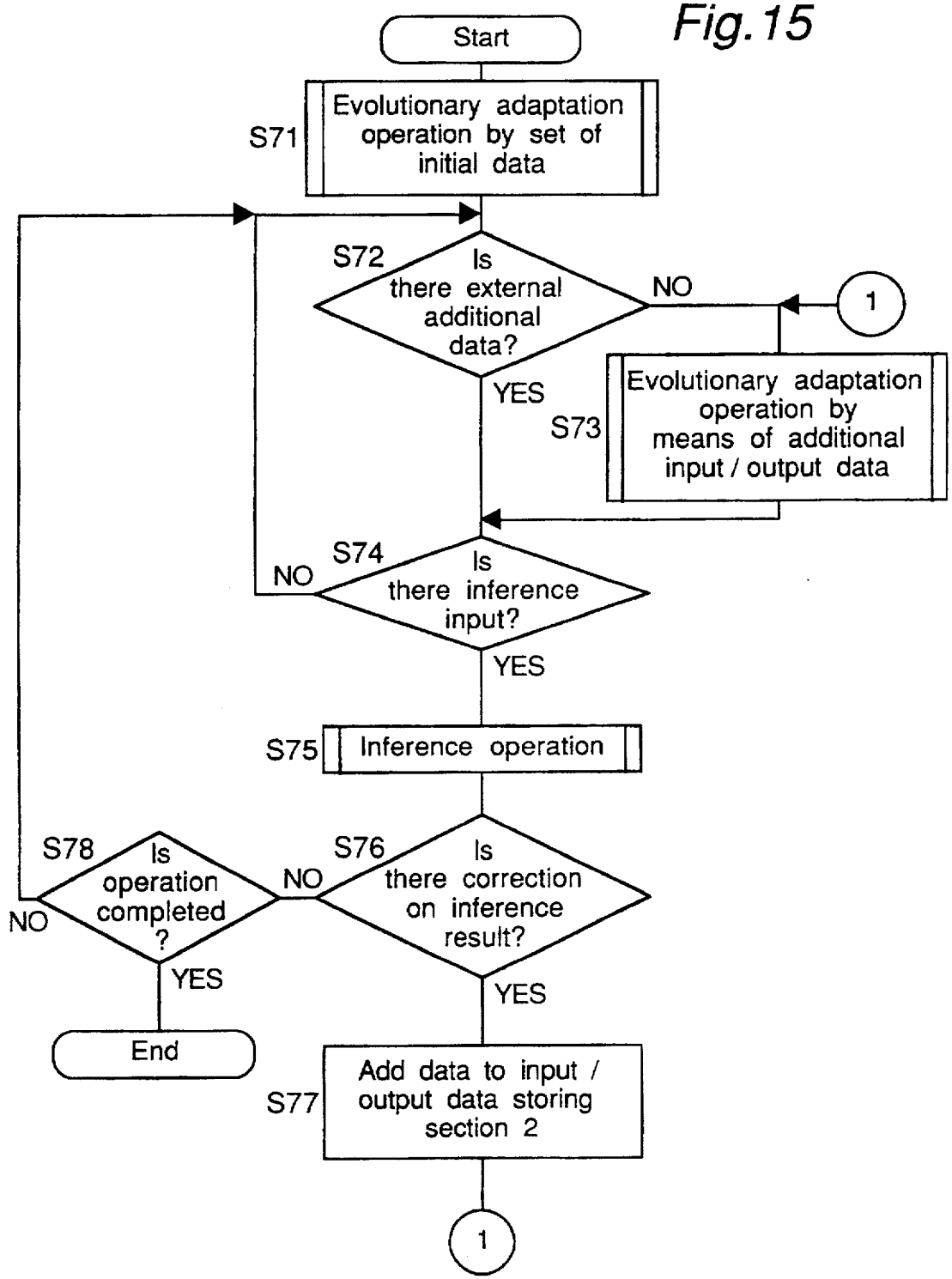
FIG. 15 is a flowchart of a fuzzy inference processing operation executed by the fuzzy inference apparatus shown in FIG. 14.

FIG. 15 shows a flowchart of the fuzzy inference processing operation to be executed by the fuzzy inference apparatus 21. The fuzzy inference processing operation will be described below with reference to FIG. 15.

In step S71, the evolutionary adaptation operation is executed by the fuzzy rule extracting section 4 of the evolutionary adaptation type inference knowledge extracting apparatus 1 by using a set of initial data registered in the input/output data storing section 2, so that the evolutionarily adapted fuzzy rule is extracted and then stored in the fuzzy rule storing section 3. Then, the extracted fuzzy rule (k,l) is outputted from the output section 23.

In step S72, it is decided whether or not there is addition of new external input/output data to the input/output data storing section 2. Consequently, when there is addition of input/output data, the program flow proceeds to step S73. Otherwise, the program flow proceeds to step S74.

In step S73, the initial values of the model parameters $\mu_{klj}$ and $\sigma_{klj}$ of the fuzzy rule (k,l) stored in the fuzzy rule storing section 3 of the evolutionary adaptation type inference knowledge extracting apparatus 1 have been set to the values obtained at the time of completion of the previous evolutionary adaptation operation. Each gene of each individual $Ind_{kl}$ in the fuzzy rule individual group storing section 6 is set according to the initial values of the model parameters $\mu_{klj}$ and $\sigma_{klj}$ by the fuzzy rule gene associating section 5, and the additional evolutionary adaptation operation is effected by the additional input/output data. Consequently, the extracted fuzzy rule (k,l) is outputted from the output section 23.

In step S74, it is decided whether or not numeric data for inference has been inputted (referred to as an inference input hereinafter) from the inference input section 24.

Consequently, when there has been an inference input, the program flow proceeds to step S75. Otherwise, the program flow returns to step S72 to wait for the input of additional data and inference input.

In step S75, the inference by means of the fuzzy rule (k.l) extracted through the evolutionary adaptation operation in step S71 or step S73 is effected on the numeric data (input vector I) inputted from the inference input section 24 according to the Equation (3), Equation (4) and Equation (5). Consequently, the obtained inference result $P_k(I)$ is outputted from the output section 23.

In step S76, it is decided whether or not the numeric data used in the inference operation in step S75 and the corrected data of the inference result for the numeric data have been inputted from the inference input section 24 to the inference result correcting section 25. Consequently, when there has been an inference input (i.e., when a correction is effected on the inference result), the program flow proceeds to step S77. Otherwise, the program flow proceeds to step S78.

In step S77, new input/output data is generated from the numeric data inputted from the inference input section 24 and the corrected data by the inference result correcting section 25, and then the data is stored in the input/output data storing section 2 of the evolutionary adaptation type inference knowledge extracting apparatus 1. Thereafter, the program flow returns to step S73 to effect the additional evolutionary adaptation operation on the fuzzy rule individual group storing section 6 by means of the added input/output data.

In step S78, it is decided whether or not there is an external command for completing the fuzzy inference processing operation. Consequently, when there is no such command, the program flow returns to step S72 to wait for input of additional data or inference input. Otherwise, when there is the command, the fuzzy inference processing operation is completed.

As described above, according to the fuzzy inference apparatus of the present embodiment, the inference operation is executed in the fuzzy inference section 22 by means of the fuzzy rule (k.l) extracted by the evolutionary adaptation type inference knowledge extracting apparatus 1 of the first embodiment. Therefore, when it is required to correct the inference result obtained through the inference operation by inputting the numeric data from the inference input section 24 because the inference result is not correct, the correct inference result with respect to the numeric data can be obtained by inputting the input/output data comprised of the numeric data and the corrected data from the inference result correcting section 25 to the input/output data storing section 2 of the evolutionary adaptation type inference knowledge extracting apparatus 1 and subjecting the fuzzy rule individual group storing section 6 to the additional evolutionary adaptation operation by means of the new input/output data.

Furthermore, when an input/output data is added externally, the inference operation can be executed by means of the fuzzy rule (k.l) extracted adaptively to the change of tendency of the input/output data by subjecting the fuzzy rule individual group storing section 6 to the additional evolutionary adaptation operation by means of the additional input/output data.

Third embodiment

The present embodiment is related to a POS data analyzing apparatus for analyzing POS data by means of the fuzzy inference apparatus having the evolutionary adaptation type inference knowledge extracting apparatus 1 of the first embodiment.

Figure 16:
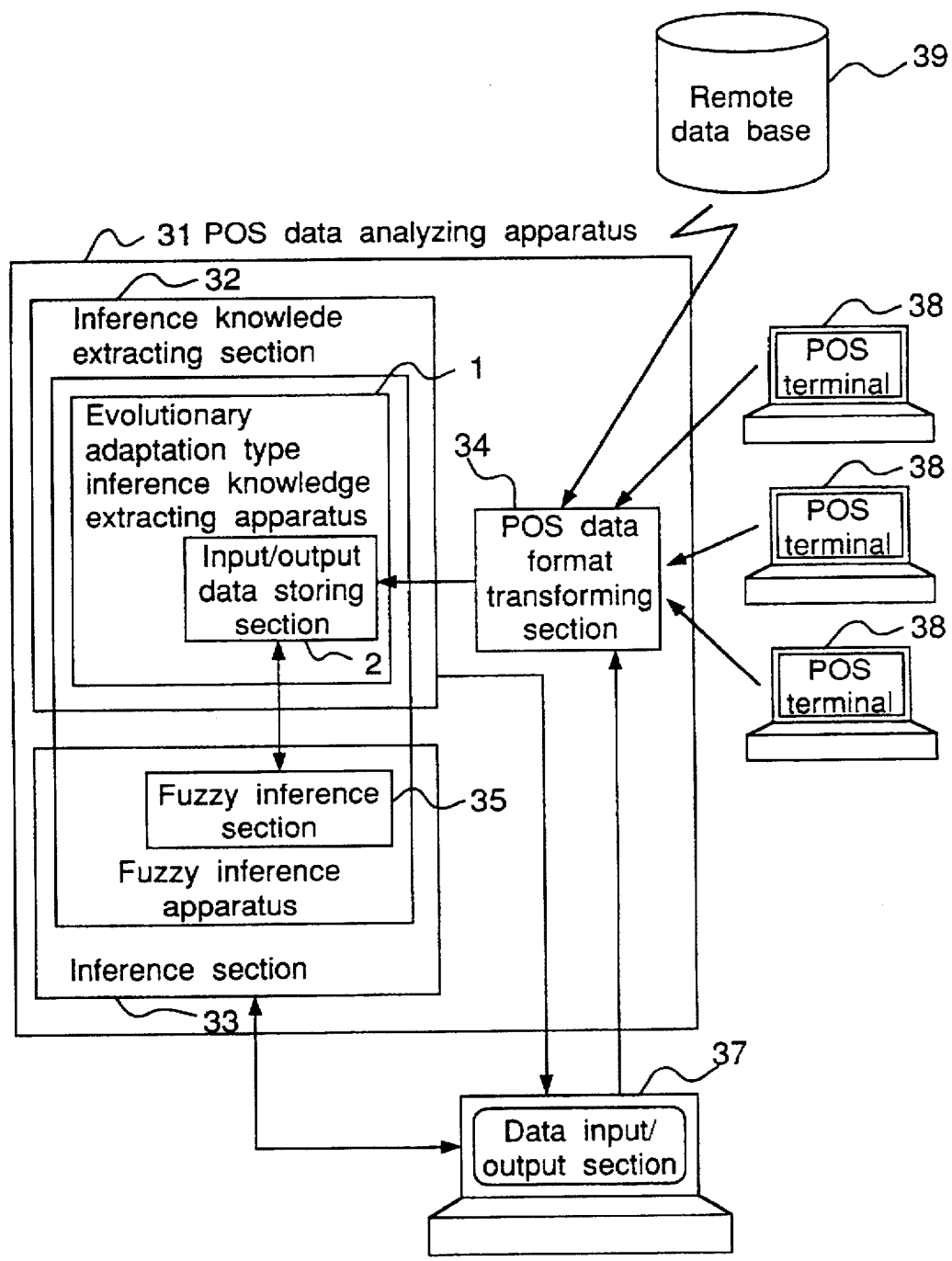
FIG. 16 is a schematic view of a POS data analyzing apparatus employing the fuzzy inference apparatus shown in FIG. 14.

FIG. 16 is a schematic view of the POS data analyzing apparatus of the present embodiment.

The POS data analyzing apparatus 31 comprises an inference knowledge extracting section 32, an inference section 33 and a POS data format transforming section 34.

The inference knowledge extracting section 32 has the evolutionary adaptation type inference knowledge extracting apparatus 1 of the present embodiment. In FIG. 16, the construction of the evolutionary adaptation type inference knowledge extracting apparatus 1 is represented by the input/output data storing section 2, while the fuzzy rule storing section, fuzzy rule extracting section, fuzzy rule individual group storing section and so forth are not shown.

Then, the POS data is analyzed by effecting the additional evolutionary adaptation operation on the fuzzy rule individual group storing section by means of the input/output data stored in the input/output data storing section 2, and the fuzzy rule is extracted.

The inference section 33 has a fuzzy inference section 35 (corresponding to the fuzzy inference section 22 of the second embodiment). Then, inference is effected on the numeric data for inference inputted from a data input/output section 37 by means of the fuzzy rule extracted by the inference knowledge extracting section 32, and the inference result is transferred to the data input/output section 37.

The POS data format transforming section 34 transforms the data transferred from the data input/output section 37, POS terminals 38 and a remote data base 39 located in a remote place into input/output data that can be managed by the evolutionary adaptation type inference knowledge extracting apparatus 1, and transfers the input/output data to the input/output data storing section 2 of the inference knowledge extracting section 32. Furthermore, as described above, the data input/output section 37 inputs the numeric data for inference to the inference section 33 or displays a POS data analysis result from the inference knowledge extracting section 32 or an inference result from the inference section 33.

Operation of the POS data analyzing apparatus will be described in the concrete below.

Data are occasionally transferred from the POS terminal 38 in each district and the remote data base 39 to the POS data format transforming section 34. Then, the POS data format transforming section 34 takes out environmental data of the time, temperature, humidity, price index, traffic volume and the like at the point of sales as well as commodity sales amount, transforms the data into an input/output data format (i.e., the format as expressed by the Equation (1)) of the input/output data storing section 2, and stores the data into the input/output data storing section 2.

Further, when the environmental data and the sales amount at the point of sales are directly inputted from the data input/output section 37 by an operator, the data are similarly transformed into the input/output data format to be stored in the input/output data storing section 2.

As described in connection with the first embodiment, the inference knowledge extracting section 32 effects the evolutionary adaptation operation on the fuzzy rule individual group storing section by means of all the input/output data stored in the input/output data storing section 2 of the evolutionary adaptation type inference knowledge extracting apparatus 1. Then, the model parameters $\mu_{klj}$ and $\sigma_{klj}$ of each fuzzy rule (k.l) obtained through the evolutionary adaptation operation are updated so that the output error of the fuzzy rule is minimized with respect to the stored input/output data, i.e., in a manner that the parameters represent environmental data such that the sales amount expressed by an associated discrete value or non-numeric value $C_k$ can be obtained.

That is, according to each fuzzy rule (k,l), the POS data analysis result (knowledge) of the tendency of physical distribution is expressed.

The thus obtained POS data analysis result is displayed in a specified format by the data input/output section 37.

Further, the inference section 33 effects inference on the numeric data (such as the above environmental data of a district in which the sales prediction is desired to be effected) from the data input/output section 37 by means of the extracted fuzzy rule. The inference result (discrete value or non-numeric value $C_k$ representing the sales amount) is displayed by the data input/output section 37.

Thus, there is provided a support for a variety of decision of the users.

When a user desires to correct the inference result, it is appropriate for the user to input the corrected data and the used numeric data from the data input/output section 37 to the POS data format transforming section 34 so as to execute the additional evolutionary adaptation operation in the inference knowledge extracting section 32. Furthermore, when an additional data is transferred from a POS terminal 38 after the inference operation is once executed, it is proper to execute the inference operation again in the inference section 33 after executing the additional evolutionary adaptation operation in the inference knowledge extracting section 32.

In short, the evolutionary adaptation type inference knowledge extracting apparatus 1 and the fuzzy inference section 35 constitute the fuzzy inference apparatus of the second embodiment.

Figure 17:
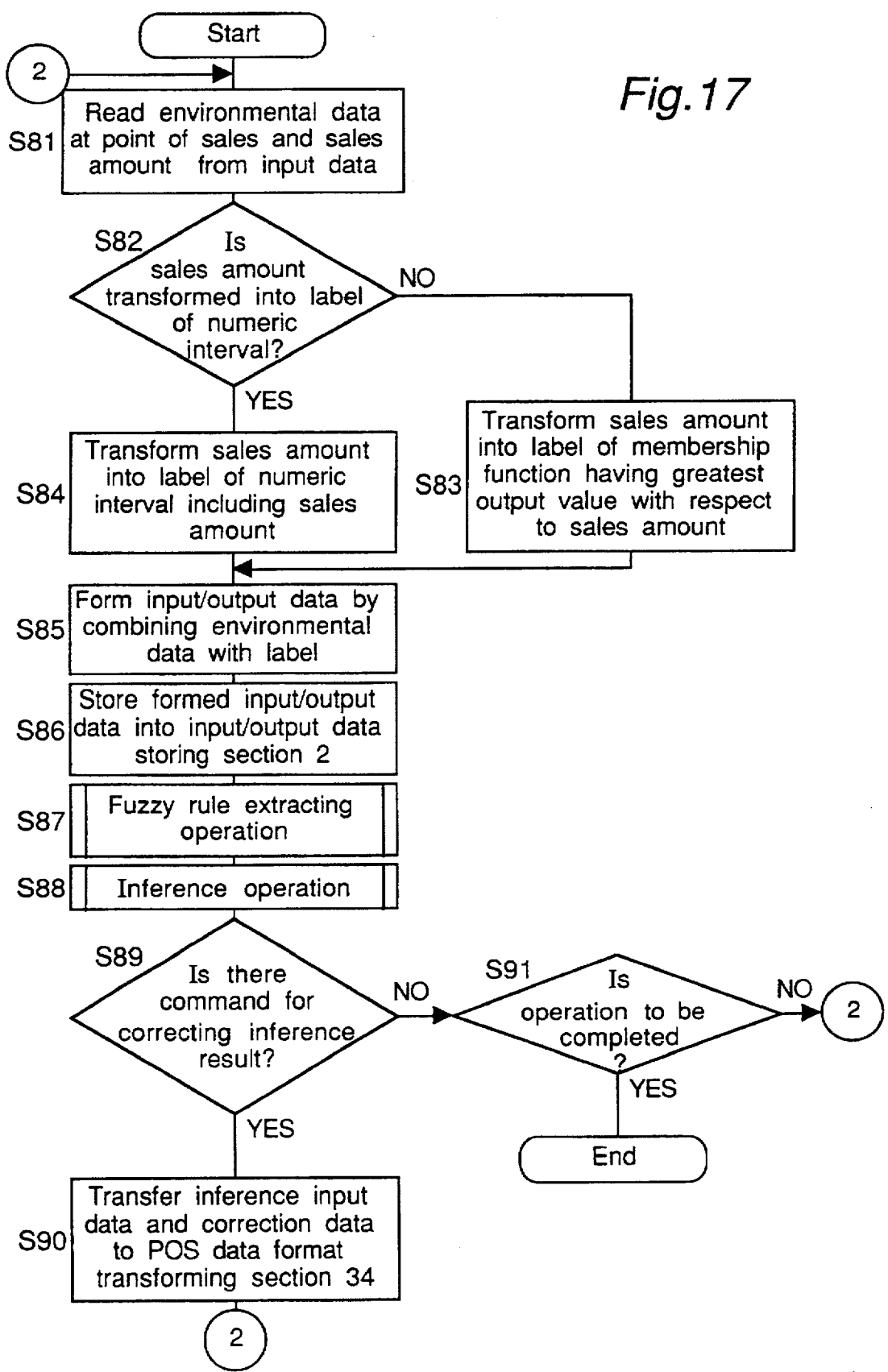
FIG. 17 is a flowchart of a POS data analyzing operation executed by the POS data analyzing apparatus shown in FIG. 16.

FIG. 17 is a flowchart of the POS data analyzing operation to be executed by the POS data analyzing apparatus 31. The POS data analyzing operation will be described in the concrete below with reference to FIG. 17.

In step S81, the environmental data at the point of sales and the commodity sales amount are read from the data transferred from the POS terminal 38 in each district, the remote data base 39 and the data input/output section 37 by the POS data format transforming section 34.

In step S82, it is decided whether or not the sales amount to be an output value of the input/output data is to be transformed into a label of numeric interval. Consequently, when the sales amount is transformed into a label of numeric interval, the program flow proceeds to step S84. Otherwise, the program flow proceeds to step S83.

In step S83, each of the read sales amounts is transformed into a label of fuzzy variable of the membership function exhibiting the greatest output value when each sales amount is applied to the membership function of the fuzzy variable with regard to the sales amount.

In Step S84, each read sales amount is transformed into a label of numeric interval including each sales amount.

Thus, in step S83 or step S84, the read sales amount is transformed into a symbol or language representing the sales condition.

Further, in step S85, numeric values of environmental data are used as inputs, and a label (symbol or language) representing the sales condition obtained through the step S83 or step S84 by transforming the sales amount corresponding to the input data is used as output data. The input data and output data are combined with each other, and, for example, there is formed an input/output data in the format of:

(temperature, humidity, price index, traffic volume; sales condition (great, small, moderate)).

In step S86, the formed input/output data is further stored in the input/output data storing section 2.

In step S87, the fuzzy rule extracting section of the evolutionary adaptation type inference knowledge extracting apparatus 1 is activated by the inference knowledge extracting section 32 based on a command from the data input/output section 37 to effect the evolutionary adaptation operation on the fuzzy rule individual group storing section by using the input/output data stored in the input/output data storing section 2, so that the obtained POS data analysis result of the tendency of physical distribution is displayed at the data input/output section 37. Further, a fuzzy rule is extracted.

In step S88, an inference input is inputted to the fuzzy inference section 35 of the inference section 33 from the data input/output section 37 by an operator, and an inference operation is effected on the inputted numeric data by the fuzzy inference section 35. Then, the inference result is displayed by the data input/output section 37.

In step S89, it is decided whether or not there is a command for correcting the inference result issued by the operator from the data input/output section 37. Consequently, when there is the command, the program flow proceeds to step S90. When there is no such command, the program flow proceeds to step S91.

In step S90, corrected data (corrected language or symbol representing the sales condition) of the inference result inputted by the operator from the data input/output section 37 and the numeric data (environmental data at the point of sales) used in step S88 are transferred to the POS data format transforming section 34.

Thereafter, the program flow returns to step S81 to proceed to formation of input/output data based on the used numeric data and the corrected data of the inference result and to an evolutionary adaptation operation by means of the input/output data.

In step S91, it is decided whether or not there is a command for completing the POS data analyzing operation issued by the operator from the data input/output section 37. Consequently, when there is no such command, the program flow returns to step S81. When there is the command, the POS data analyzing operation is completed.

As described above, in the present embodiment, the POS data analyzing apparatus 31 is constituted by the inference knowledge extracting section 32 having the evolutionary adaptation type inference knowledge extracting apparatus 1 of the first embodiment, the inference section 33, and the POS data format transforming section 34. Then, the externally transferred data are transformed by the POS data format transforming section 34 into a format that can be used in the evolutionary adaptation type inference knowledge extracting apparatus 1, and the transformed data are stored into the input/output data storing section 2.

Then, the evolutionary adaptation operation is effected on the fuzzy rule individual group storing section by the inference knowledge extracting section 32 by means of the POS data stored in the input/output data storing section 2, so that the fuzzy rule representing the POS data analysis result is extracted.

Thereafter, when numeric data for inference is inputted from the data input/output section 37, the inference operation of the numeric data is effected by the fuzzy inference section 35 of the inference section 33, and the obtained inference result is displayed by the data input/output section 37.

That is, the POS data analyzing apparatus 31 of the present embodiment is provided with the evolutionary adaptation type inference knowledge extracting apparatus 1 of the first embodiment, and the inference operation is effected by the fuzzy inference section 35 by means of the fuzzy rule (k.l) extracted by the evolutionary adaptation type inference knowledge extracting apparatus 1. Therefore, when it is required to correct the obtained inference result, simply by issuing a command for extracting the rule by inputting the used numeric data and the corrected data from the data input/output section 37, the additional evolutionary adaptation operation is automatically executed by the input/output data constituted by a combination of the used numeric data and the corrected data to extract the fuzzy rule. Thus, a re-inference operation can be achieved.

Furthermore, when there is addition of data from the POS terminal 38 or the remote data base 39, by effecting the additional evolutionary adaptation operation on the fuzzy rule individual group storing section of the inference knowledge extracting section 32, the POS data can be analyzed by means of the fuzzy rule extracted in an evolutionary adaptation manner with respect to the change of tendency of the POS data.

Algorithms of the high fitness individual selecting operation, crossing-over gene manipulating operation, mutational gene manipulating operation and evolutionary adaptation operation in the first embodiment, the fuzzy inference processing operation in the second embodiment, and the POS data analyzing operation in the third embodiment are not limited to those of the flowcharts shown in FIGS. 4, 9, 12, 13, 15 and 17.

Furthermore, the fuzzy membership function of the fuzzy rule (k.l) mounted in the evolutionary adaptation type inference knowledge extracting apparatus 1 in each of the above embodiments is not limited especially to the Gaussian type membership function $F_{k,l,j}$, and another radial base function is also acceptable.

As is apparent from the above description, according to the evolutionary adaptation type inference knowledge extracting apparatus of the present invention, the fuzzy rule individual group storing section is mounted with a set of individuals associated with the fuzzy rule of the fuzzy rule storing section by the fuzzy rule gene associating section, and the fuzzy rule gene associating section, individual fitness calculating section, fuzzy rule individual selecting section, fuzzy rule individual gene manipulating section and rule weight deciding section function to effect the evolutionary adaptation operation on the fuzzy rule individual group storing section. Therefore, each individual fitted to the characteristic of the input/output data stored in the input/output data storing section is selected, and the set of the selected individuals are further evolutionarily adapted, thereby allowing the fuzzy rule expressing clearly the tendency of the input/output data to be easily extracted.

Therefore, even when the tendency of the input/output data stored in the input/output data storing section dynamically changes, the tendency of the input/output data can be expressed by being evolutionarily adapted to the change of the tendency of the input/output data by effecting the additional evolutionary adaptation operation on the fuzzy rule individual group storing section.

Furthermore, according to the evolutionary adaptation type inference knowledge extracting apparatus of one embodiment, the fuzzy rule individual gene manipulating section is provided with a crossing-over gene manipulating means. Therefore, by the crossing-over gene manipulating operation of the crossing-over gene manipulating means, with the real number value based on the two genes corresponding to two individuals belonging to an identical group stored in the fuzzy rule individual group storing section used as a gene, a new individual belonging to the group is generated. Then, all the individuals in the group are replaced by the newly generated individual.

Therefore, according to this embodiment, each individual fitted to the characteristic of the input/output data selected by the fuzzy rule individual selecting section is further evolutionarily adapted through the crossing-over gene manipulating operation.

Furthermore, according to the evolutionary adaptation type inference knowledge extracting apparatus of one embodiment, the crossing-over gene manipulating means is provided with a gene generating means. Therefore, the gene of the newly generated individual can be generated by obtaining an average value of the corresponding two genes of the above two individuals.

Furthermore, according to the evolutionary adaptation type inference knowledge extracting apparatus of one embodiment, the crossing-over gene manipulating means is provided with a gene generating means. Therefore, the gene of the newly generated individual can be generated by putting the real number value of either one of the corresponding two genes of the two individuals close to or apart from the average value of both the genes.

Furthermore, according to the evolutionary adaptation type inference knowledge extracting apparatus of one embodiment, the fuzzy rule individual gene manipulating section is provided with a mutational gene manipulating means. Therefore, by the mutational gene manipulating operation of the mutational gene manipulating means, an arbitrary gene of the individual stored in the fuzzy rule individual group storing section is replaced by another real number value to generate a new gene.

Therefore, according to this embodiment, the individual fitted to the characteristic of the input/output data selected by the fuzzy rule individual selecting section is further evolutionarily adapted through the mutational gene manipulating operation.

Furthermore, according to the evolutionary adaptation type inference knowledge extracting apparatus of one embodiment, the mutational gene manipulating means is provided with a gene replacing means. Therefore, an arbitrary gene of the individual stored in the fuzzy rule individual group storing section is replaced by an arbitrary real number value to generate a new individual.

Furthermore, according to the evolutionary adaptation type inference knowledge extracting apparatus of one embodiment, the mutational gene manipulating means is provided with a partial gene string replacing means. Therefore, the partial gene string subsequent to an arbitrary gene of the individual stored in the fuzzy rule individual group storing section is replaced by an arbitrary partial gene string of another individual to generate a new individual.

Furthermore, according to the fuzzy inference apparatus of one embodiment, the fuzzy rule to be used in effecting the fuzzy inference operation by the fuzzy inference section is extracted by the evolutionary adaptation type inference knowledge extracting apparatus. Therefore, even when an additional input/output data is externally inputted, the inference operation can be executed by means of the fuzzy rule that has been extracted as evolutionarily adapted to the change of the tendency of the input/output data by effecting the additional evolutionary adaptation operation on the fuzzy rule individual group storing section by means of the additional data.

Furthermore, in correcting the inference result obtained by the fuzzy inference section, there is formed an input/output data constituted by a combination of the numeric data inputted from the inference input section and the corrected data of the inference result when the incorrect inference result is obtained, and the data is inputted in a feedback manner to the input/output data storing section of the evolutionary adaptation type inference knowledge extracting section. Therefore, the correct inference result can be obtained by effecting the additional evolutionary adaptation operation on the fuzzy rule individual group storing section by means of the corrected data.

Furthermore, according to the POS data analyzing apparatus of one embodiment, the POS data is transformed into a format that can be managed by the evolutionary adaptation type inference knowledge extracting apparatus, by the data format transforming section, and the evolutionary adaptation operation is effected on the fuzzy rule individual group storing section so that the error in the transformed POS data with respect to the input data is minimized by the evolutionary adaptation type inference knowledge extracting apparatus. Therefore, the fuzzy rule extracted by being associated with the individual stored in the fuzzy rule individual group storing section after the evolutionary adaptation operation represents the tendency of the physical distribution included in the POS data. Therefore, according to the present embodiment, the tendency of the physical distribution included in the POS data can be precisely analyzed.

Furthermore, the inference section effects the fuzzy inference operation with regard to the physical distribution by means of the fuzzy rule extracted by the evolutionary adaptation type inference knowledge extracting apparatus. Therefore, when the obtained inference result is required to be corrected, the additional evolutionary adaptation operation can be effected on the fuzzy rule individual group storing section by the input/output data constituted by the combination of the used numeric data and the corrected data by inputting the used numeric data and the corrected data to the data format transforming section. Therefore, the correct inference result can be obtained by means of the fuzzy rule extracted after the additional evolutionary adaptation operation.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An evolutionary adaptation type inference knowledge extracting apparatus comprising:

an input/output data storing section which stores input/output data constituted by a combination of input data comprised of a plurality of numeric values and output data comprised of one discrete value or non-numeric value;

a fuzzy rule gene associating section which associates each of a plurality of fuzzy rules stored in a fuzzy rule storing section with an individual comprised of a gene string for expressing a parameter of each fuzzy membership function of the fuzzy rule by a real number value;

a fuzzy rule individual group storing section which stores a group of a plurality of individuals associated with the fuzzy rule having an identical discrete value or non-numeric value in a posterior part thereof by the fuzzy rule gene associating section;

an individual fitness calculating section which operates, based on a fitness of an anterior part of the fuzzy rule associated with an individual by the fuzzy rule gene associating section with respect to all input/output data stored in the input/output data storing section, to calculates a fitness of the individual;

a fuzzy rule individual selecting section which stochastically selects an individual having a high fitness to the set of the input/output data stored in the input/output data storing section based on the fitness of each individual calculated by the individual fitness calculating section;

a fuzzy rule individual gene manipulating section which generates a new individual by subjecting the individual stored in the fuzzy rule individual group storing section to a gene manipulating operation; and a rule weight deciding section which operates, based on the fitness calculated by the individual fitness calculating section, to normalize the fitness of each individual every group, thereby deciding a weight of the fuzzy rule corresponding to the individual; whereby each individual fitted to a characteristic of the input/output data stored in the input/output data storing section is selected, and a fuzzy rule is extracted that is evolutionarily adapted to the input/output data by subjecting the group of the selected individuals to an evolutionary adaptation operation.

2. An evolutionary adaptation type inference knowledge extracting apparatus as claimed in claim 1, wherein the fuzzy rule individual gene manipulating section has a crossing-over gene manipulating means, using as genes real number values based on two corresponding genes of two individuals belonging to an identical group stored in the fuzzy rule individual group storing section, for executing a crossing-over gene manipulating operation for generating a new individual belonging to the group, and replacing all the individuals in the group with the newly generated individual.

3. An evolutionary adaptation type inference knowledge extracting apparatus as claimed in claim 2, wherein the crossing-over gene manipulating means has a gene generating means for obtaining an average value of corresponding two genes of the two individuals so as to generate a gene of the new individual.

4. An evolutionary adaptation type inference knowledge extracting apparatus as claimed in claim 2, wherein the crossing-over gene manipulating means has a gene generating means for putting a real number value which is either one of the corresponding two genes of the two individuals close to or apart from an average value of both the genes so as to generate a gene of the new individual.

5. An evolutionary adaptation type inference knowledge extracting apparatus as claimed in claim 1, wherein the fuzzy rule individual gene manipulating section has a mutational gene manipulating means for executing a mutational gene manipulating operation for replacing an arbitrary gene of each individual stored in the fuzzy rule individual group storing section with another real number value.

6. An evolutionary adaptation type inference knowledge extracting apparatus as claimed in claim 5, wherein the mutational gene manipulating means has a gene replacing means for replacing the arbitrary gene with an arbitrary real number value when executing the gene replacing operation.

7. An evolutionary adaptation type inference knowledge extracting apparatus as claimed in claim 5, wherein the mutational gene manipulating means has a partial gene string replacing means for replacing a partial gene string subsequent to the arbitrary gene with a partial gene string of another arbitrary individual when executing the gene replacing operation.

8. A fuzzy inference apparatus comprising:

the evolutionary adaptation type inference knowledge extracting apparatus as claimed in claim 1;

an inference input section for inputting numeric data for inference;

a fuzzy inference section for effecting fuzzy inference on the numeric data inputted from the inference input section by means of a fuzzy rule extracted by the evolutionary adaptation type inference knowledge extracting apparatus;

an output section for outputting the fuzzy rule extracted by the evolutionary adaptation type inference knowledge extracting apparatus or a result of the fuzzy inference executed by the fuzzy inference section; and an inference result correcting section which operates, when correcting the inference result of the numeric data inputted to the fuzzy inference section, to form an input/output data comprised of a combination of the numeric data and corrected data of the inference result, and input the generated data in a feedback manner to an input/output data storing section of the evolutionary adaptation type inference knowledge extracting apparatus.

9. A point of sales data analyzing apparatus comprising:

data format transforming section for transforming a point of sales data into a format of input/output data constituted by a combination of input data comprised of a plurality of numeric values and output data comprised of one discrete value or non-numeric value;

the evolutionary adaptation type inference knowledge extracting apparatus as claimed in claim 1, the apparatus operating, when the input data of the point of sales data transformed by the data format transforming section is inputted, to extract a fuzzy rule representing a tendency of physical distribution included in the point of sales data by updating in an evolutionary adaptation manner a parameter of a fuzzy rule so that an output error with respect to the input data is minimized; and an inference section for outputting an inference result by executing a fuzzy inference operation with regard to the physical distribution by means of the fuzzy rule extracted by the evolutionary adaptation type inference knowledge extracting apparatus.

* * * * *